US012706238B2

(12) United States Patent
Okumura et al.

(10) Patent No.: US 12,706,238 B2

(45) Date of Patent: Aug. 11, 2026

(54) INDUCTOR

(71) Applicant: NITTO DENKO CORPORATION, Osaka (JP)

(72) Inventors: Keisuke Okumura, Osaka (JP); Yoshihiro Furukawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 716 days.

(21) Appl. No.: 17/437,663

(22) PCT Filed: Feb. 5, 2020

(86) PCT No.: PCT/JP2020/004232

§ 371 (c)(1),
(2) Date: Sep. 9, 2021

(87) PCT Pub. No.: WO2020/183993

PCT Pub. Date: Sep. 17, 2020

(65) Prior Publication Data

US 2022/0165481 A1 May 26, 2022

(30) Foreign Application Priority Data

Mar. 12, 2019 (JP) ................................ 2019-044778

(51) Int. Cl.
*H01F 27/28* (2006.01)
*H01F 27/32* (2006.01)
*H01F 17/04* (2006.01)

(52) U.S. Cl.
CPC ......... *H01F 27/2823* (2013.01); *H01F 27/32* (2013.01); *H01F 27/324* (2013.01); *H01F 17/04* (2013.01); *Y10T 428/32* (2015.01)

(58) Field of Classification Search
CPC .... H01F 27/2823; H01F 27/32; H01F 27/324; H01F 17/04; Y10T 428/32
See application file for complete search history.

(56) References Cited

U.S. PATENT DOCUMENTS 6,392,525 B1 5/2002 Kato et al.
11,508,507 B2 11/2022 Okumura et al.
(Continued)

FOREIGN PATENT DOCUMENTS

CN 101615490 A 12/2009
CN 102969109 A 3/2013
(Continued)

OTHER PUBLICATIONS

International Preliminary Report on Patentability issued by WIPO on Aug. 25, 2021, in connection with International Patent Application No. PCT/JP2020/004223.
(Continued)

*Primary Examiner* — Holly Rickman
(74) *Attorney, Agent, or Firm* — Edwards Neils LLC; Jean C. Edwards, Esq.

(57) ABSTRACT

An inductor includes a wire, and a magnetic layer having a sheet shape and for embedding the wire. The wire includes a conducting wire, and an insulating film disposed on a conducting wire circumferential surface of the conducting wire. The magnetic layer contains an anisotropic magnetic particle at a ratio of 40% by volume or more. Of a first plane section, a second plane section, and a third plane section along a plane direction of the magnetic layer described below, when viewed in at least each of the two plane sections, in a first direction perpendicular to a flow direction and a thickness direction, an orientated region in which the anisotropic magnetic particle is orientated in the flow direction is observed in a vicinity region within 50 μm from a first directional outer end edge of the insulating film outwardly.

3 Claims, 10 Drawing Sheets

(56) References Cited

U.S. PATENT DOCUMENTS

| | | | |
|---|---|---|---|
| 2004/0246084 | A1 | 12/2004 | Matsutani et al. |
| 2006/0006884 | A1 | 1/2006 | Yamada et al. |
| 2006/0152321 | A1 | 7/2006 | Jung et al. |
| 2007/0247268 | A1 | 10/2007 | Oya et al. |
| 2008/0164844 | A1 | 7/2008 | Kato et al. |
| 2009/0002117 | A1 | 1/2009 | Kawarai |
| 2009/0243780 | A1 | 10/2009 | Inoue et al. |
| 2013/0168149 | A1 | 7/2013 | Gundel |
| 2013/0228717 | A1 | 9/2013 | Harada et al. |
| 2014/0167897 | A1 | 6/2014 | Choi et al. |
| 2014/0253276 | A1 | 9/2014 | Iwasaki et al. |
| 2015/0102888 | A1 | 4/2015 | Kim et al. |
| 2015/0371752 | A1 | 12/2015 | Park et al. |
| 2016/0086727 | A1 | 3/2016 | Choi et al. |
| 2016/0126006 | A1 | 5/2016 | Ahn et al. |
| 2016/0172086 | A1 | 6/2016 | Habu et al. |
| 2016/0247612 | A1 | 8/2016 | Ebe et al. |
| 2016/0343498 | A1 | 11/2016 | Lee et al. |
| 2017/0004915 | A1 | 1/2017 | Park et al. |
| 2017/0117082 | A1 | 4/2017 | Jeong |
| 2017/0140864 | A1 | 5/2017 | Arai et al. |
| 2017/0148561 | A1 | 5/2017 | Yoon et al. |
| 2018/0005739 | A1 | 1/2018 | Orimo et al. |
| 2018/0061550 | A1 | 3/2018 | Lee et al. |
| 2018/0114627 | A1 | 4/2018 | Arai et al. |
| 2018/0166194 | A1 | 6/2018 | Choi |
| 2018/0268983 | A1 | 9/2018 | Kwon et al. |
| 2018/0286555 | A1 | 10/2018 | Aoki et al. |
| 2018/0286569 | A1 | 10/2018 | Ahn et al. |
| 2018/0358164 | A1 | 12/2018 | Arai et al. |
| 2019/0013148 | A1 | 1/2019 | Ohkubo et al. |
| 2019/0096566 | A1 | 3/2019 | Oahara et al. |
| 2019/0180909 | A1 | 6/2019 | Shinohara et al. |
| 2019/0189340 | A1 | 6/2019 | Kim et al. |
| 2019/0244743 | A1 | 8/2019 | Hirai et al. |
| 2020/0075238 | A1 | 3/2020 | Okumura et al. |
| 2020/0168375 | A1 | 5/2020 | Park et al. |
| 2020/0258666 | A1 | 8/2020 | Kou et al. |
| 2022/0384091 | A1 | 12/2022 | Yoshioka et al. |

FOREIGN PATENT DOCUMENTS

| | | | |
|---|---|---|---|
| CN | 104036917 | A | 9/2014 |
| CN | 104575942 | A | 4/2015 |
| CN | 105225802 | A | 1/2016 |
| CN | 105575621 | A | 5/2016 |
| CN | 105895307 | A | 8/2016 |
| CN | 107017081 | A | 8/2017 |
| EP | 2 963 094 | A1 | 1/2016 |
| JP | S48-088475 | U | 10/1973 |
| JP | H05-152130 | A | 6/1993 |
| JP | H09-246467 | A | 9/1997 |
| JP | 10-074626 | A | 3/1998 |
| JP | H10-144526 | A | 5/1998 |
| JP | H11-040979 | A | 2/1999 |
| JP | 2001-185421 | A | 7/2001 |
| JP | 2003-282333 | A | 10/2003 |
| JP | 2004-109121 | A | 4/2004 |
| JP | 2007-116347 | A | 5/2007 |
| JP | 2008-098406 | A | 4/2008 |
| JP | 2008-172873 | A | 7/2008 |
| JP | 2009-009985 | A | 1/2009 |
| JP | 2012-043579 | A | 3/2012 |
| JP | 2013-543635 | A | 12/2013 |
| JP | 2014-165363 | A | 9/2014 |
| JP | 2014-183193 | A | 9/2014 |
| JP | 2015-092544 | A | 5/2015 |
| JP | 2016-092422 | A | 5/2016 |
| JP | 2016-167497 | A | 9/2016 |
| JP | 2017-005115 | A | 1/2017 |
| JP | 2017-017314 | A | 1/2017 |
| JP | 2017-037888 | A | 2/2017 |
| JP | 2018-011043 | A | 1/2018 |
| JP | 2018032841 | A | 3/2018 |
| JP | 2018-092092 | A | 6/2018 |
| JP | 2018-098494 | A | 6/2018 |
| JP | 2019-220618 | A | 12/2019 |
| KR | 20160099882 | A | 8/2016 |
| KR | 10-2017-0085889 | A | 7/2017 |
| TW | 201513142 | A | 4/2015 |
| TW | 201707019 | A | 2/2017 |
| TW | 201826295 | A | 7/2018 |
| WO | 2014/132701 | A1 | 9/2014 |
| WO | 2016/199638 | A1 | 12/2016 |
| WO | 2019/244620 | A1 | 12/2019 |

OTHER PUBLICATIONS

International Preliminary Report on Patentability issued by WIPO on Aug. 25, 2021, in connection with International Patent Application No. PCT/JP2020/004234.

International Preliminary Report on Patentability issued by WIPO on Aug. 25, 2021, in connection with International Patent Application No. PCT/JP2020/004236.

Office Action, issued by the Taiwanese Patent Office on Mar. 7, 2024, in connection with Taiwanese Patent Application No. 109104912.

Office Action, issued by the Taiwanese Patent Office on Mar. 7, 2024, in connection with Taiwanese Patent Application No. 109104913.

Non-Final Office Action issued in U.S. Appl. No. 17/437,671 on May 7, 2024.

International Search Report Issued in PCT/JP2020/004232 on Apr. 21, 2020.

Written Opinion Issued in PCT/JP2020/004232 on Apr. 21, 2020.

International Search Report Issued in PCT/JP2020/004225 on Apr. 14, 2020.

Written Opinion Issued in PCT/JP2020/004225 on Apr. 14, 2020.

International Search Report Issued in PCT/JP2020/004238 on Apr. 28, 2020.

Written Opinion Issued in PCT/JP2020/004238 on Apr. 28, 2020.

International Search Report Issued in PCT/JP2020/004228 on Apr. 28, 2020.

Written Opinion Issued in PCT/JP2020/004228 on Apr. 28, 2020.

International Search Report Issued in PCT/JP2020/004233 on Apr. 28, 2020.

Written Opinion Issued in PCT/JP2020/004233 on Apr. 28, 2020.

Office Action, issued by the Japanese Patent Office on Dec. 20, 2022, in connection with Japanese Patent Application No. 2019-044768.

Office Action, issued by the Japanese Patent Office on Dec. 20, 2022, in connection with Japanese Patent Application No. 2019-044771.

International Preliminary Report on Patentability issued by WIPO on Aug. 25, 2021, in connection with International Patent Application No. PCT/JP2020/004232.

International Preliminary Report on Patentability issued by WIPO on Aug. 25, 2021, in connection with International Patent Application No. PCT/JP2020/004225.

International Preliminary Report on Patentability issued by WIPO on Aug. 25, 2021, in connection with International Patent Application No. PCT/JP2020/004238.

International Preliminary Report on Patentability issued by WIPO on Aug. 25, 2021, in connection with International Patent Application No. PCT/JP2020/004228.

International Preliminary Report on Patentability issued by WIPO on Aug. 25, 2021, in connection with International Patent Application No. PCT/JP2020/004233.

Office Action, issued by the Japanese Patent Office on Jan. 31, 2023, in connection with Japanese Patent Application No. 2019-044778.

Decision of Refusal, issued by the Japanese Patent Office on May 16, 2023, in connection with Japanese Patent Application No. 2019-044778.

Office Action, issued by the Japanese Patent Office on Jan. 10, 2023, in connection with Japanese Patent Application No. 2019-044779.

Decision of Refusal, issued by the Japanese Patent Office on Mar. 7, 2023, in connection with Japanese Patent Application No. 2019-044771.

(56) References Cited

OTHER PUBLICATIONS

Notification of Reasons to Refusal, issued by the Japanese Patent Office on Mar. 7, 2023, in connection with Japanese Patent Application No. 2019-044768.
Notification of Reasons to Refusal, issued by the Japanese Patent Office on Feb. 28, 2023, in connection with Japanese Patent Application No. 2019-044773.
Non-Final Office Action issued in U.S. Appl. No. 17/437,673 on Mar. 27, 2024.
Office Action, issued by the Korean Intellectual Property Office on Jan. 20, 2025, in connection with Korean Patent Application No. 10-2021-7028621.
Office Action, issued by China National Intellectual Property Administration on Jan. 15, 2025, in connection with Chinese Patent Application No. 202080017640.7.
Office Action, issued by the Korean Intellectual Property Office on Apr. 16, 2025, in connection with Korean Patent Application No. 10-2021-7028618.
Office Action, issued by the Chinese National Intellectual Property Office on Apr. 19, 2025, in connection with Chinese Patent Application No. 202080017615.9.
Office Action, issued by the Chinese National Intellectual Property Office on Apr. 23, 2025, in connection with Chinese Patent Application No. 202080019771.9.
Office Action, issued by the Chinese National Intellectual Property Office on Apr. 19, 2025, in connection with Chinese Patent Application No. 202080019818.1.
Office Action, issued by the Korean Intellectual Property Office on Jun. 7, 2024, in connection with Korean Patent Application No. 10-2021-7028621.
Office Action, issued by the Korean Intellectual Property Office on Jun. 11, 2024, in connection with Korean Patent Application No. 10-2021-7028618.
Office Action, issued by the Korean Intellectual Property Office on Jun. 7, 2024, in connection with Korean Patent Application No. 10-2021-7028625.
Office Action, issued by the Korean Intellectual Property Office on Jun. 7, 2024, in connection with Korean Patent Application No. 10-2021-7028626.
Office Action, issued by China National Intellectual Property Office on Dec. 17, 2025, in connection with Chinese Patent Application No. 202080017615.9.
Office Action, issued by the Taiwanese Patent Office on Mar. 21, 2024, in connection with Taiwanese Patent Application No. 109104915.
Office Action, issued by the Taiwanese Patent Office on Mar. 21, 2024, in connection with Taiwanese Patent Application No. 109104980.
Non-Final Office Action issued in U.S. Appl. No. 17/437,682 on May 13, 2024.
Non-Final Office Action issued in U.S. Appl. No. 17/437,680 on May 29, 2024.

SEM image in longitudinal section of Example 1

SEM image in first plane section of Example 1

SEM image in second plane section of Example 1

SEM image in third plane section of Example 1

FIG. 8A SEM image in first plane section of Example 3
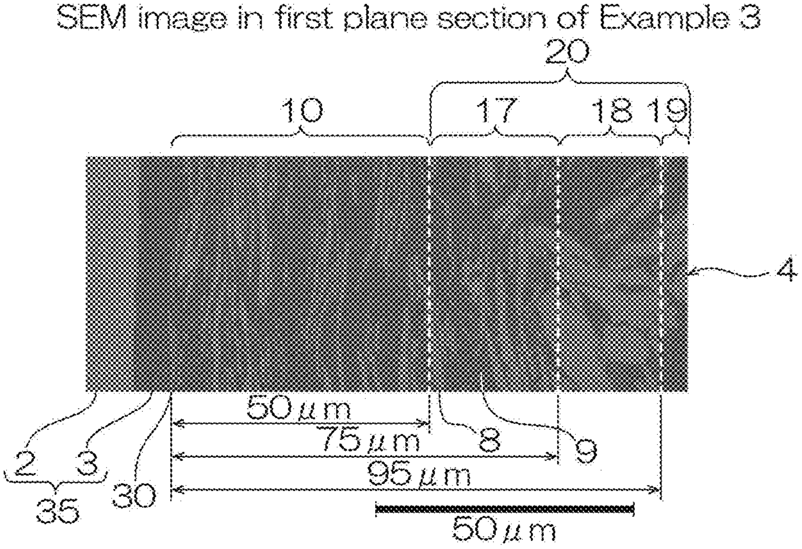
FIG. 8B SEM image in second plane section of Example 3
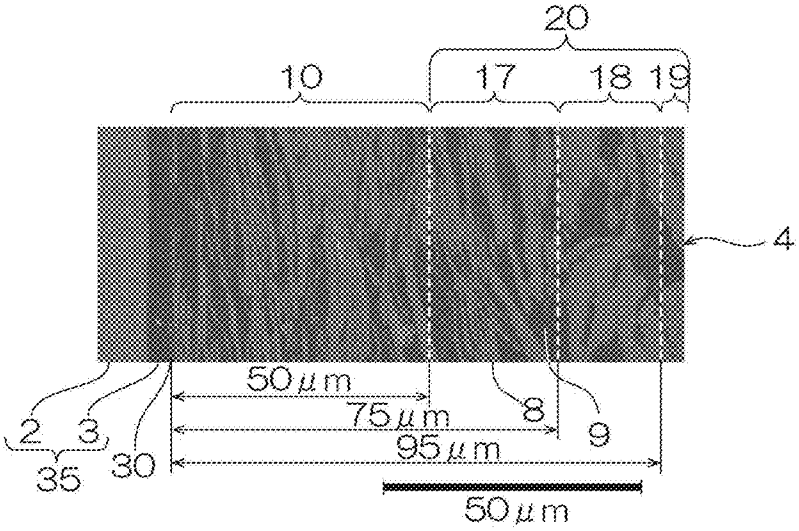
FIG. 8C SEM image in third plane section of Example 3
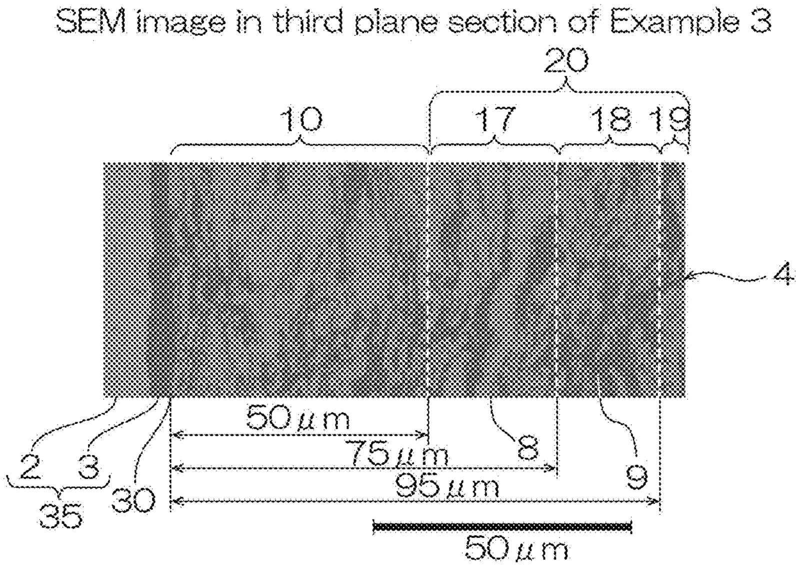

FIG. 9A SEM image in longitudinal section of Comp. Ex. 1
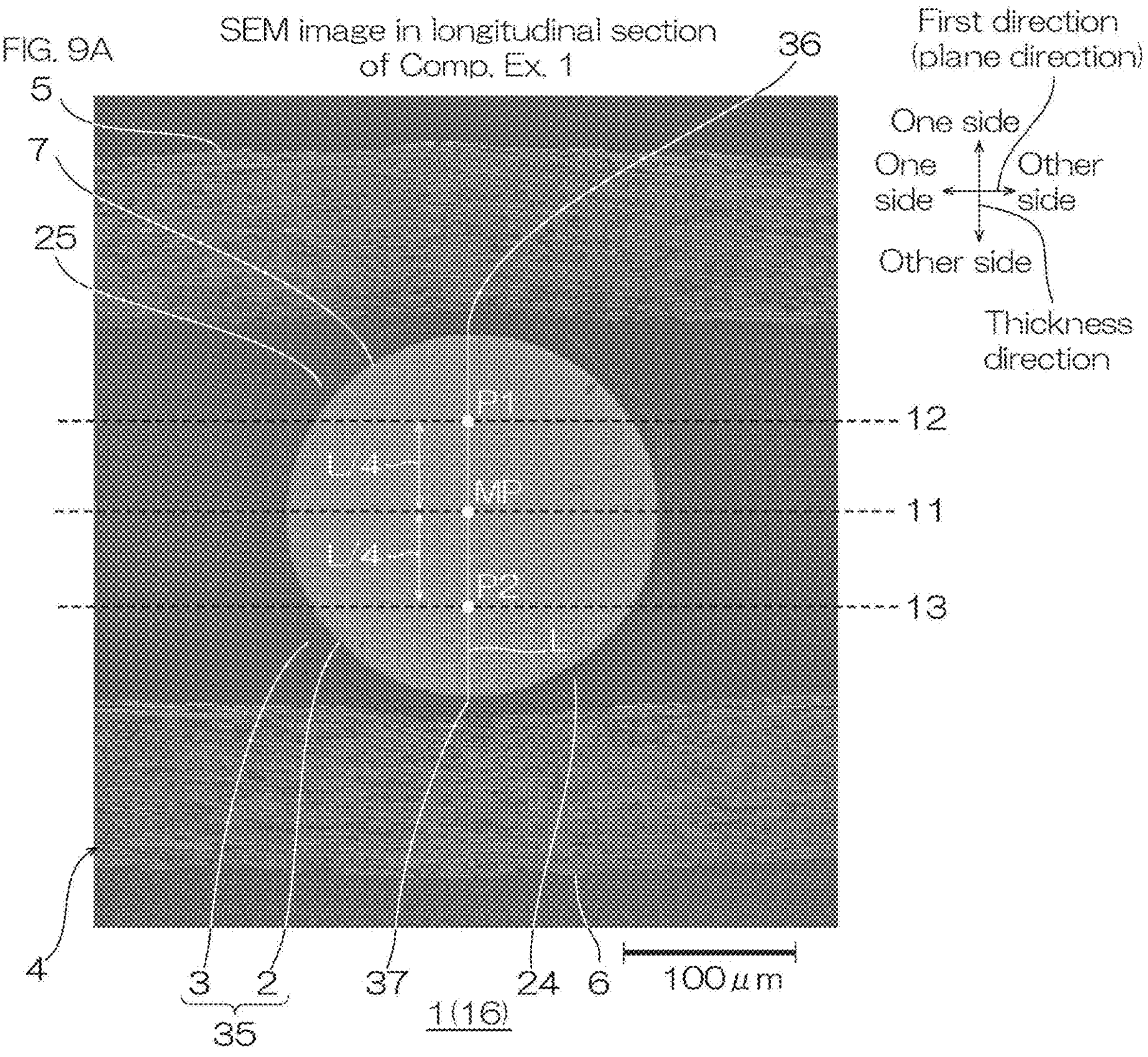
FIG. 9B SEM image in first plane section of Comp. Ex. 1
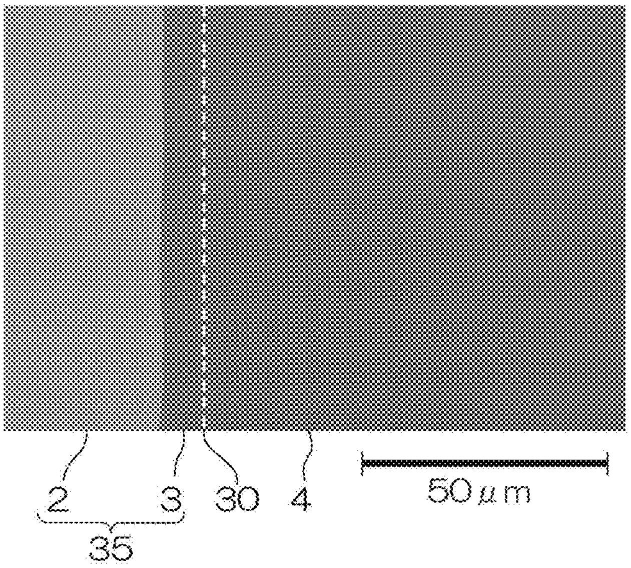

SEM image in first plane section of Example 3

INDUCTOR

CROSS-REFERENCE TO RELATED APPLICATIONS

The present application is a 35 U.S.C. 371 National Stage Entry PCT/JP2020/004232, filed on Feb. 5, 2020, which claims priority from Japanese Patent Application No. 2019-044778, filed on Mar. 12, 2019, the contents of all of which are herein incorporated by reference in their entirety.

TECHNICAL FIELD

The present invention relates to an inductor.

BACKGROUND ART

Conventionally, it has been known that an inductor is loaded on an electronic device and the like to be used as a passive element for a voltage conversion member and the like.

For example, an inductor including a rectangular parallelepiped chip body portion made of a magnetic material, and an inner conductor embedded in the interior of the chip body portion has been proposed (ref; for example, Patent Document 1 below).

CITATION LIST

Patent Document

Patent Document 1: Japanese Unexamined Patent Publication No. H10-144526

SUMMARY OF THE INVENTION

Problem to be Solved by the Invention

In recent years, a high level of inductance is required for the inductor. However, there is a problem that the inductor of Patent Document 1 cannot satisfy the above-described demand.

The present invention provides an inductor having excellent inductance.

Means for Solving the Problem

The present invention (1) includes an inductor including a wire including a conducting wire, and an insulating film disposed on a circumferential surface of the conducting wire, and a magnetic layer for embedding the wire, wherein the magnetic layer contains an anisotropic magnetic particle at a ratio of 40% by volume or more; and of a first plane section, a second plane section, and a third plane section along a plane direction perpendicular to a thickness direction of the magnetic layer, when viewed in at least each of the two plane sections, in a first direction perpendicular to a flow direction of electricity and the thickness direction, an orientated region in which the anisotropic magnetic particle is orientated in the flow direction is observed in a vicinity region within 50 μm from an outer end edge of the insulating film outwardly.

The first plane section: passing through a midpoint of a line segment L connecting one end edge to the other end edge in the thickness direction of the conducting wire.

The second plane section passing through a first point at a position traveling from the midpoint toward rate side in the thickness direction by a length of ¼ of the line segment L (¼ L).

The third plane section: passing through a second point at a position traveling from the midpoint toward the other side in the thickness direction by the length (¼ L).

In the inductor, of the first plane section, the second plane section, and the third plane section, when viewed in at least each of the two plane sections, the orientated region in which the anisotropic magnetic particle is orientated in the flow direction is observed in the vicinity region. Therefore, in the vicinity region having a strong influence on the inductance of the inductor, a magnetic path along the flow direction is formed.

Further, the magnetic layer contains the anisotropic magnetic particle at a high ratio of 40% by volume or more.

Therefore, the inductor has excellent inductance.

The present invention (2) includes the inductor described in (1), wherein when viewing the magnetic layer in each of the first plane section, the second plane section, and the third plane section, the orientated region is observed in the vicinity region.

In the inductor 1, in all of the first plane section, the second plane section, and the third plane section, since the orientated region is observed in the vicinity region, the inductor has further more excellent inductance.

The present invention (3) includes the inductor described in (1) or (2), wherein when viewed in a cross-section perpendicular to a direction along the wire, the conducting wire has a generally circular shape, the anisotropic magnetic particle has a generally plate shape, and in the orientated region, a plane direction of the anisotropic magnetic particle is along a circumferential direction of the conducting wire.

In the orientated region of the inductor, the plane direction of the anisotropic magnetic particle is orientated in the circumferential direction of the conducting wire. Therefore, the magnetic path surrounding the conducting wire is formed. As a result, the inductance is further more excellent.

Effect of the Invention

The inductor of the present invention has excellent inductance.

BRIEF DESCRIPTION OF THE DRAWINGS

FIG. 2A illustrating a view of the first plane section,

FIG. 2B illustrating an enlarged view of FIG. 2A, and

FIG. 2C illustrating an enlarged view of FIG. 2B.

FIG. 3A illustrating a view of the second plane section,

FIG. 3B illustrating an enlarged view of FIG. 3A, and

FIG. 3C illustrating an enlarged view of FIG. 3B.

FIG. 4A illustrating a view of the third plane section.

FIG. 4B illustrating an enlarged view of FIG. 4A, and

FIG. 4C illustrating an enlarged view of FIG. 4B.

FIG. 5A illustrating a step of preparing a first magnetic sheet and a wire,

FIG. 5B illustrating a step of embedding the wire by the first magnetic sheet, and preparing a second magnetic sheet and a third magnetic sheet, and FIG. 5C illustrating a step of sandwiching the wire and the first magnetic sheet between the second magnetic sheet and the third magnetic sheet.

FIGS. 8A to 8C show image process views of SEM images of a first plane section to a third plane section of the inductor shown in FIG. 7;

FIG. 8A illustrating a view of the first plane section,

FIG. 8B illustrating a view of the second plane section, and

FIG. 8C illustrating a view of the third plane section.

FIGS. 9A to 9B show image process views of SEM images of a longitudinal section to a first plane section of Comparative Example 1;

FIG. 9A illustrating a view of the longitudinal section and

FIG. 9B illustrating a view of the first plane section.

DESCRIPTION OF EMBODIMENTS

One embodiment of an inductor of the present invention is described with reference to SEM images shown in FIGS. 1A to 4C.

Figure 1:
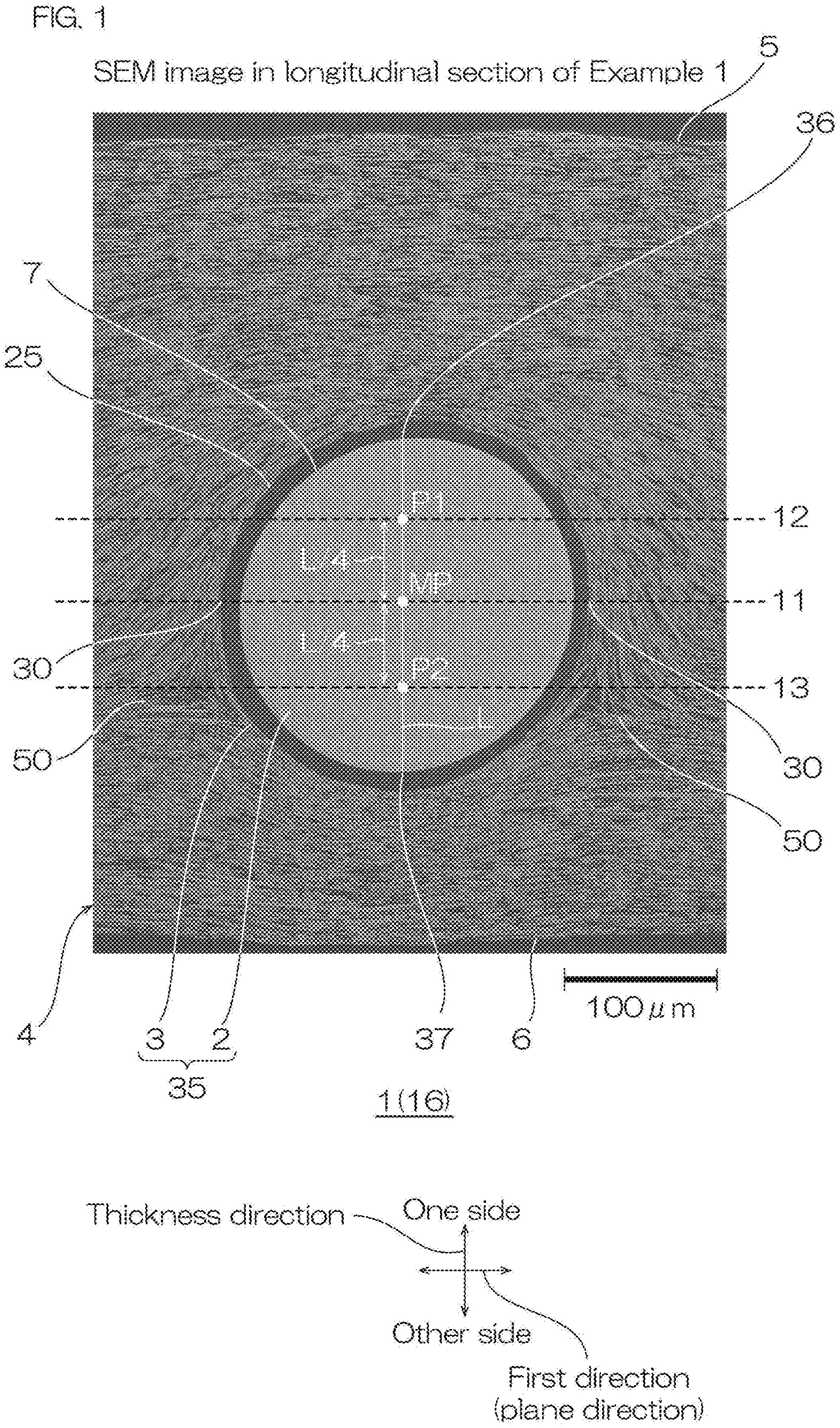
FIG. 1 shows an image process view of an SEM image of a longitudinal section of Example 1 which is a specific example of one embodiment of an inductor of the present invention.

As shown in FIG. 1, an inductor 1 has a shape extending in a plane direction perpendicular to a thickness direction (direction along a plane in FIGS. 2A to 4C). The inductor 1 has one surface 5 and an other surface 6 facing each other in the thickness direction. The one surface 5 and the other surface 6 are substantially parallel to each other, and have a generally flat shape.

The inductor 1 includes a wire 35 and a magnetic layer 4.

The plurality of wires 35 are provided at spaced intervals to each other in the plane direction in the inductor when viewed m a longitudinal section 16 perpendicular to a direction along the wire 35. In the following description, one wire 35 is described, and the same applies to the other wires 35.

Figure 2A:
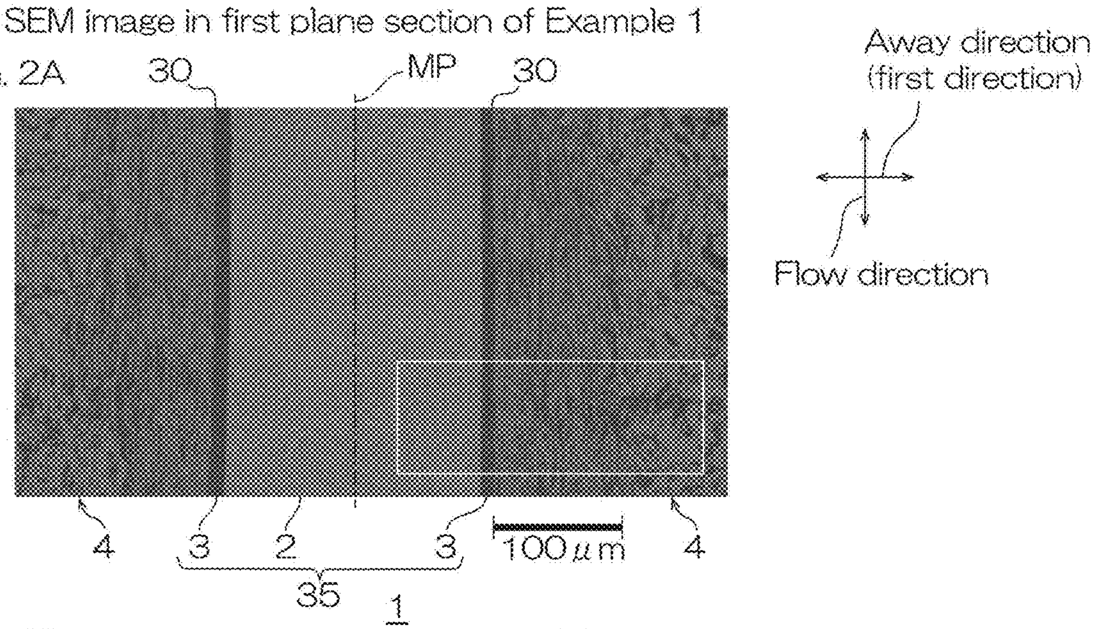
FIGS. 2A to 2C show image process views of an SEM image of a first plane section of the inductor shown in FIG. 1.

As shown in FIG. 2A, the wire 35 has a shape extending along one direction included in the plane direction of the inductor 1. Further, as shown in FIG. 1, the wire 35 has a generally circular shape when viewed in the longitudinal section 16.

When viewed in tire longitudinal section 16" includes a case where a cut surface along the longitudinal section 16 is produced to be subjected to SEM observation. The description above is also applies to when viewed in the longitudinal section 16, a first plane section 11, a second plane section 12, and a third plane section 13 to be described later.

The wire 35 includes a conducting wire (a conducting line) 2 and an insulating film 3.

The conducting wire 2 has a shape extending along the above-described one direction. Further, as shown in FIG. 1, the conducting wire 2 has a generally circular shape when viewed in the longitudinal section 16 along a direction perpendicular to a flow direction (direction along). Thus, the conducting wire 2 has a conducting wire circumferential surface 7 when viewed in the longitudinal section 16.

Examples of a material for the conducting wire 2 include metal conductors such as copper, silver, gold, aluminum, nickel, and an alloy of these, and preferably, copper is used. The conducting wire 2 may have a single-layer structure, or a multi-layer structure in which plating (for example, nickel) is applied to the surface of a core conductor (for example, copper).

A radius of the conducting wire 2 is, for example, 25 μm or more, preferably 50 μm or more, and for example, 2000 μm or less, preferably 200 μm or less.

The insulating film 3 protects the conducting wire 2 from chemicals and water, and also prevents a short circuit of the conducting wire 2 with the magnetic layer 4. The insulating film 3 is disposed on the circumferential surface of the conducting wire 2 when viewed in the longitudinal section 16. Specifically, the insulating film 3 covers the entire conducting wire circumferential surface 7 (outer peripheral surface) of the conducting wire 2 when viewed in the longitudinal section 16. Further, the insulating film 3 has a generally circular ring shape in a cross-sectional view sharing a central axis (center) with the conducting wire 2. Thus, the insulating film 3 has an insulating circumferential surface 25 when viewed in the longitudinal section 16.

Examples of a material for the insulating film 3 include insulating resins such as polyvinyl formal, polyester, polyesterimide, polyamide (including nylon), polyimide, polyamideimide, and polyurethane. These may be used alone or in combination of two or more.

The insulating film 3 may consist of a single layer or a plurality of layers.

A thickness of the insulating film 3 is generally uniform in a radial direction of the conducting wire 2 at any position in a circumferential direction, and is, for example, 1 μm or more, preferably 3 μm or more, and for example, 100 μm or less, preferably 50 μm or less.

A ratio of the radius of the conducting wire 2 to the thickness of the insulating film 3 is, for example, 1 or more, preferably 10 or more, and for example, 500 or less, preferably 100 or less.

A radius of the wire 35 is, for example, 25 μm or more, preferably 50 μm or more, and for example, 2000 μm or less, preferably 200 μm or less.

The magnetic layer 4 improves the inductance of the inductor 1. The magnetic layer 4 embeds the wire 35. The magnetic layer 4 is disposed on the circumferential surface of the insulating film 3 when viewed in the longitudinal section 16. Specifically, the magnetic layer 4 covers the entire insulating circumferential surface 25 (outer peripheral surface) of the insulating film 3.

Further, the magnetic layer 4 forms the outer shape of the inductor 1. Specifically, the magnetic layer 4 has a sheet shape, and has a rectangular shape extending in the plane direction. More specifically, the magnetic layer 4 has one surface and the other surface facing each other in the thickness direction. One surface and the other surface of the magnetic layer 4 form the one surface 5 and the other surface 6 of the inductor 1, respectively.

The magnetic layer 4 contains anisotropic magnetic particles 8. Specifically, a material for the magnetic layer 4 is a magnetic composition containing the anisotropic magnetic particles 8 and a binder 9. Preferably, the magnetic layer 4 is a cured product of a thermosetting resin composition (composition containing the anisotropic magnetic particles 8 and a thermosetting component to be described later).

Examples of a magnetic material constituting the anisotropic magnetic particles 8 include a soft magnetic body and a hard magnetic body. Preferably, from the viewpoint of inductance, a soft magnetic body is used.

Examples of the soft magnetic body include a single metal body containing one kind of metal element in a state of a pure material and an alloy body which is a eutectic (mixture) of one or more kinds of metal element (first metal element) and one or more kinds of metal element (second metal element) and/or non-metal element (carbon, nitrogen, silicon, phosphorus, and the like). These may be used alone or in combination.

An example of the single metal body includes a metal single body consisting of only one kind of metal element (first metal element). The first metal element is, for example, appropriately selected from metal elements that can be included as the first metal element of the soft magnetic body such as iron (Fe), cobalt (Co), nickel (Ni), and the like.

Further, examples of the single metal body include an embodiment including a core including only one kind of metal dement and a surface layer including an inorganic material and/or an organic material which modify/modifies a portion of or the entire surface of the core, and an embodiment in which an organic metal compound and an inorganic metal compound including the first metal element are decomposed (thermally decomposed and the like). More specifically, an example of the latter embodiment includes an iron powder (may be referred to as a carbonyl iron powder) in which an organic iron compound (specifically, carbonyl iron) including iron as the first metal element is thermally decomposed. The position of a layer including the inorganic material and/or the organic material modifying a portion including only one kind of metal element is not limited to the above-described surface. The organic metal compound and the inorganic metal compound that can obtain the single metal body are not particularly limited, and can be appropriately selected from a known or conventional organic metal compound and inorganic metal compound that can obtain the single metal body of the soft magnetic body.

The alloy body is not particularly limited as long as it is a eutectic of one or more kinds of metal element (first metal element) and one or more kinds of metal element (second metal element) and/or non-metal element (carbon, nitrogen, silicon, phosphorus, and the like), and can be used as an alloy body of a soft magnetic body.

The first metal element is an essential element in the alloy body, and examples thereof include non (Fe), cobalt (Co), and nickel (Ni). When the first metal element is Fe, the alloy body is referred to as an Fe-based alloy, when the first metal element is Co, the alloy body is referred to as a Co-based alloy: and when the first metal element is Ni, the alloy body is referred to as a Ni-based alloy.

The second metal element is an element (sub-component) which is secondarily contained in the alloy body, and is a metal element to be compatible with (eutectic to) the first metal element. Examples thereof include iron (Fe) (when the first metal element is other than Fe), cobalt (Co) (when the first metal element is other than Co), nickel (Ni) (when the first metal element is other than Ni), chromium (Cr), aluminum (Al), silicon (Si), copper (Cu), silver (Ag), manganese (Mn), calcium (Ca), barium (Ba), titanium (Ti), zirconium (Zr), hafnium (Hf), vanadium (V), niobium (Nb), tantalum (Ta), molybdenum (Mo), tungsten (W), ruthenium (Ru), rhodium (Rh), zinc (Zn), gallium (Ga), indium (In), germanium (Ge), tin (Sn), lead (Pb), scandium (Sc), yttrium (Y), strontium (Sr), and various rare earth elements. These may be used alone or in combination of two or more.

The non-metal element is an element (sub-component) which is secondarily contained in the alloy body and is a non-metal element which is compatible with (eutectic to) the first metal element. Examples thereof include boron (B), carbon (C), nitrogen (N), silicon (Si), phosphorus (P), and sulfur (S). These may be used alone or in combination of two or more.

Examples of the Fe-based alloy which is one example of an alloy body include magnetic stainless steel (Fe—Cr—Al—Si alloy) (including electromagnetic stainless steel). Sendust (Fe—Si—Al alloy) (including Supersendust), permalloy (Fe—Ni alloy), Fe—Ni—Mo alloy, Fe—Ni—Mo—Cu alloy, Fe—Ni—Co alloy, Fe—Cr alloy, Fe—Cr—Al alloy, Fe—Ni—Cr alloy, Fe—Ni—Cr—Si alloy, silicon copper (Fe—Cu—Si alloy), Fe—Si alloy, Fe—Si—B (—Cu—Nb) alloy, Fe—B—Si—Cr alloy, Fe—Si—Cr—Ni alloy, Fe—Si—Cr alloy, Fe—Si—Al—Ni—Cr alloy, Fe—Ni—Si—Co alloy, Fe—N alloy, Fe—C alloy, Fe—B alloy, Fe—P alloy, ferrite (including stainless steel ferrite and further, soft ferrite such as Mn—Mg ferrite, Mn—Zn ferrite, Ni—Zn ferrite, Ni—Zn—Cu ferrite, Cu—Zn ferrite, and Cu—Mg—Zn ferrite), Permendur (Fe—Co alloy), Fe—Co—V alloy, and Fe—based amorphous alloy.

Examples of the Co—based alloy which is one example of an alloy body include Co—Ta—Zr and a cobalt (Co)—based amorphous alloy.

An example of the Ni-based alloy which is one example of an alloy body includes a Ni—Cr alloy.

Of the soft magnetic bodies, from the viewpoint of magnetic properties, preferably, an alloy body is used, more preferably, a Fe-based alloy is used, further more preferably. Sendust (Fe—Si—Al alloy) is used. Further, as the soft magnetic body, preferably, a single metal body is used, more preferably, a single metal body containing an iron element in a state of a pure material is used, further more preferably, iron alone or an iron powder (carbonyl iron powder) is used.

Examples of a shape of the anisotropic magnetic particles 8 include a flat shape (plate shape) and a needle shape from the viewpoint of anisotropy (or orientation properties), and preferably, a flat shape is used from the viewpoint of excellent relative magnetic permeability in the plane direction (two dimension). The magnetic layer 4 may further contain non-anisotropic magnetic particles in addition to the anisotropic magnetic particles 8. The non-anisotropic magnetic particles may have, for example, a shape such as spherical, granular, massive, or pelletized. An average particle size of the non-anisotropic magnetic particles is, for example, 0.1 μm or more, preferably 0.5 μm or more, and for example, 200 μm or less, preferably 150 μm or less.

A flat ratio (flatness) of the flat-shaped anisotropic magnetic particles 8 is, for example, 8 or more, preferably 15 or more, and for example, 500 or less, preferably 450 or less. The flat ratio is, for example, calculated as an aspect ratio obtained by dividing an average particle size (average length) (described later) of the anisotropic magnetic particles 8 by an average thickness of the anisotropic magnetic particles 8.

The average particle size (average length) of the anisotropic magnetic particles 8 is, for example, 3.5 μm or more, preferably 10 μm or more, and for example, 200 μm or less, preferably 150 μm or less. When the anisotropic magnetic particles 8 are flat-shaped, the average thickness thereof is, for example, 0.1 μm or more, preferably 0.2 μm or more, and for example, 3.0 μm or less, preferably 2.5 μm or less.

A ratio of the anisotropic magnetic particles 8 in the magnetic layer 4 is 40% by volume or more, preferably 45% by volume or more, more preferably 50% by volume or more, further more preferably 55% by volume or more, particularly preferably 60% by volume or more. When the ratio of the anisotropic magnetic particles 8 in the magnetic layer 4 is below the above-described lower limit, the inductor 1 cannot obtain excellent inductance.

The ratio of the anisotropic magnetic particles 8 in the magnetic layer 4 is, for example, 95% by volume or less, preferably 90% by volume or less. When the ratio of the anisotropic magnetic particles 8 is the above-described upper limit or less, the inductor 1 has excellent mechanical strength.

The binder 9 is a matrix for dispersing the anisotropic magnetic particles 8 in the magnetic layer 3. Further, the binder 9 is dispersed in a predetermined direction in the magnetic layer 3.

Specifically, examples of the binder 9 include thermoplastic components such as an acrylic resin and thermosetting components such as an epoxy resin composition. The acrylic resin contains, for example, a carboxyl group-containing acrylic acid ester copolymer. The epoxy resin composition contains, for example, an epoxy resin (cresol novolak-type epoxy resin and the like) as a mam agent, a curing agent for an epoxy resin (phenol resin and the like), and a curing accelerator for an epoxy resin (imidazole compound and the like). Preferably, the binder 9 contains a cured product of a thermosetting component. A ratio of the binder 9 in the magnetic composition is the rest of the anisotropic magnetic particles 8.

Further, when viewing the magnetic layer 4 in the longitudinal section 16, the anisotropic magnetic particles 8 covering the insulating circumferential surface 25 of the insulating film 3 are, for example, orientated along the circumferential direction of the conducting wire 2. Furthermore, when the anisotropic magnetic particles 8 are flat-shaped, when viewing the magnetic layer 4 in the longitudinal section 16, the anisotropic magnetic particles 8 covering the insulating circumferential surface 25 are orientated in the circumferential direction.

Figure 2B:
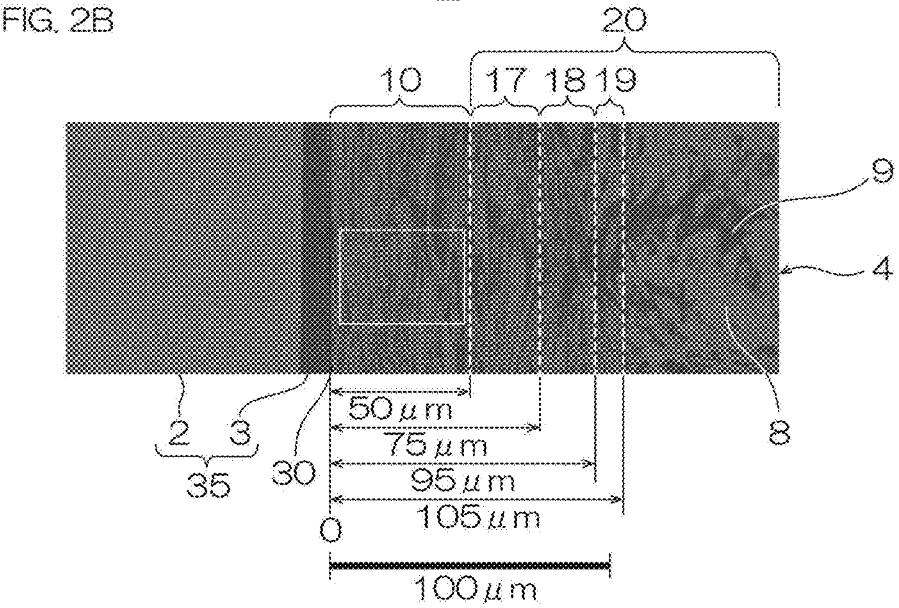
Figure 2C:
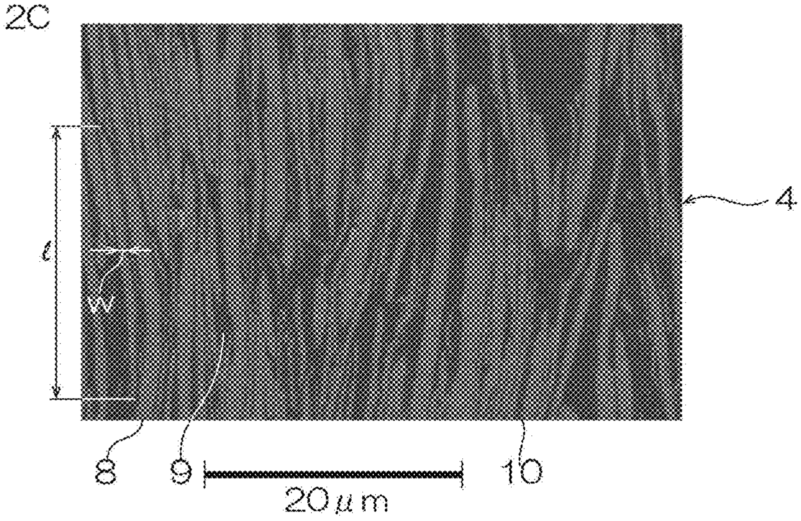
Figure 3A:
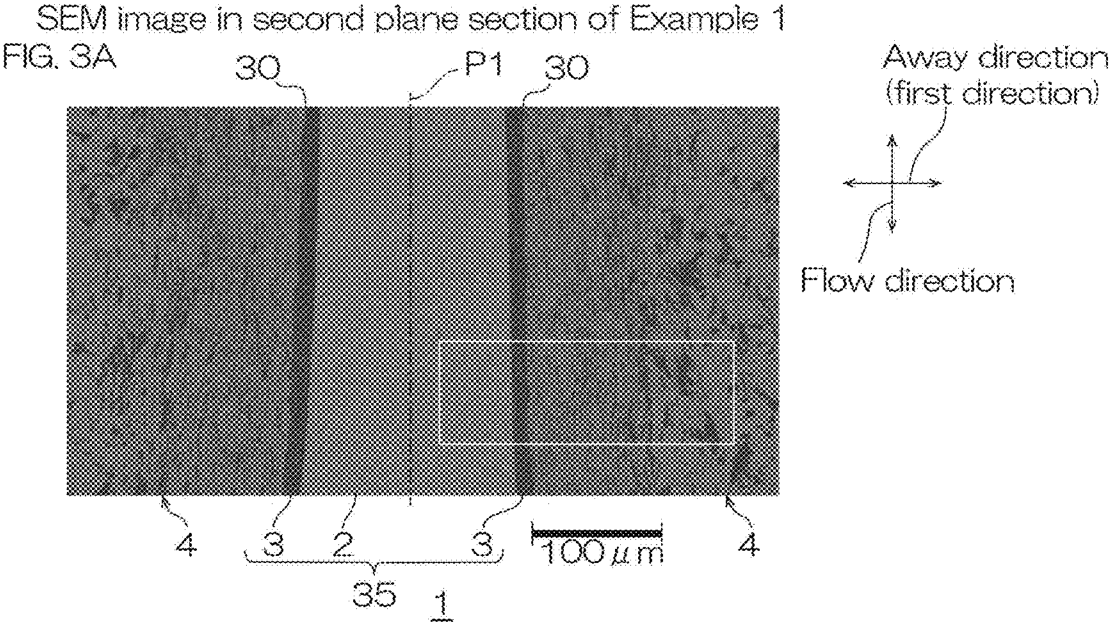
FIGS. 3A to 3C show image process views of an SEM image of a second plane section of the inductor shown in FIG. 1.
Figure 3B:
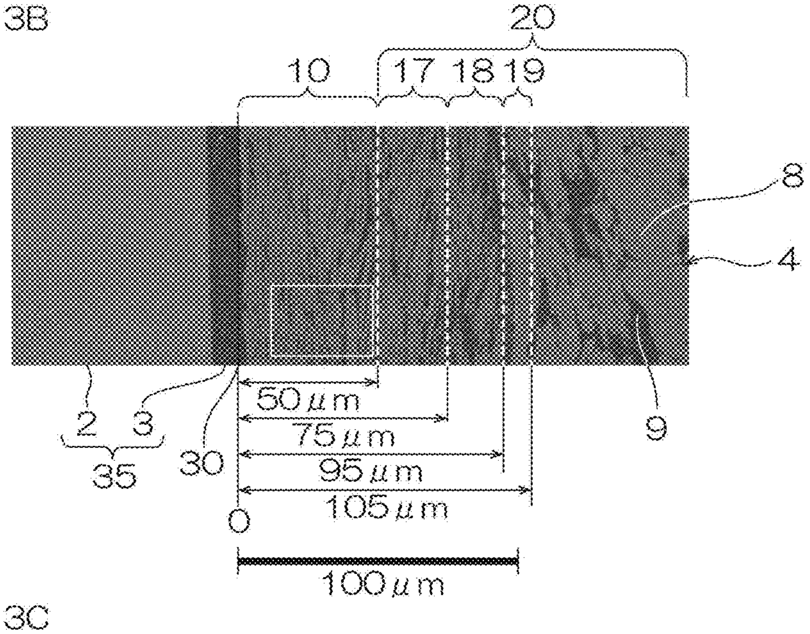
Figure 4A:
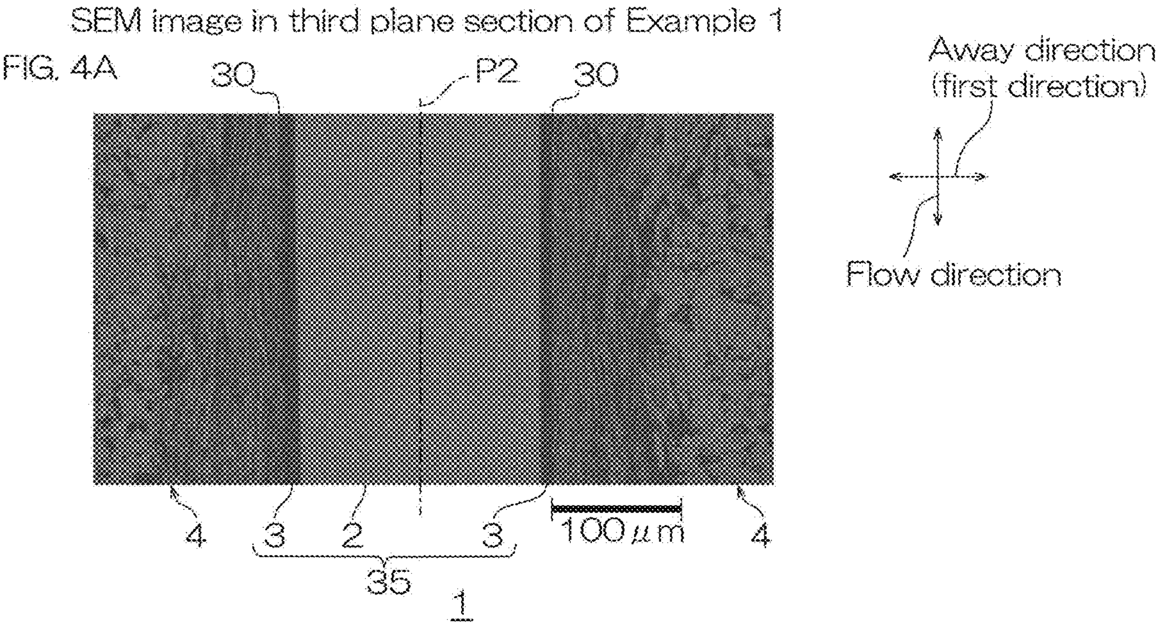
FIGS. 4A to 4C show image process views of an SEM image of a third plane section of the inductor shown in FIG. 1.
Figure 4B:
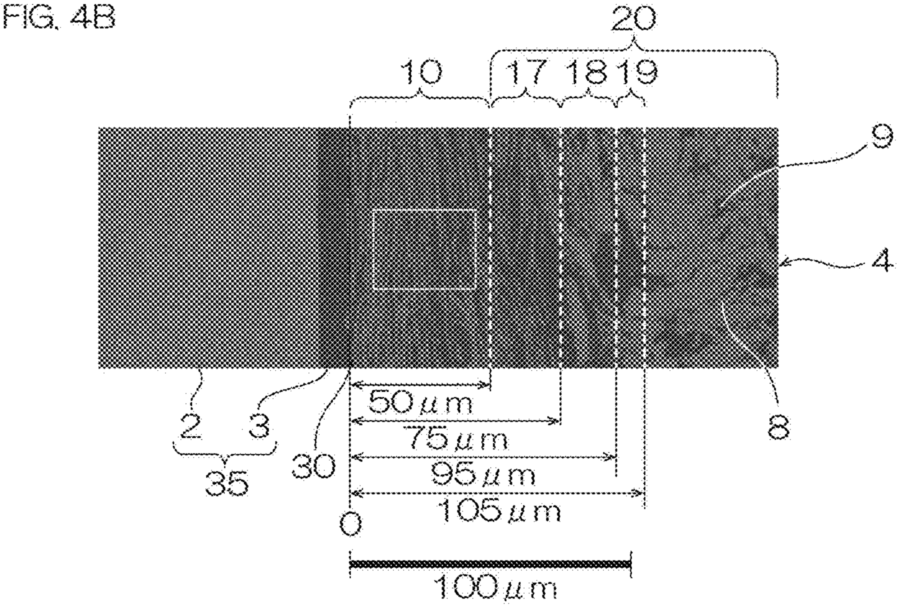
Figure 4C:
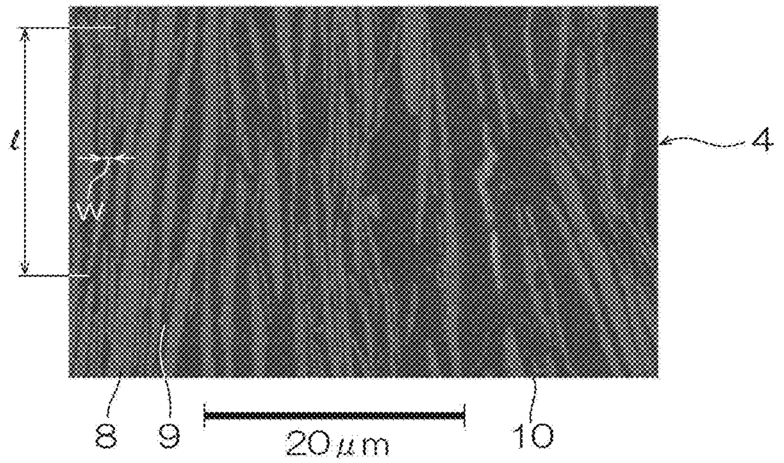

When viewed in each of the three plane sections of the first plane section 11 shown in FIGS. 2A to 2C, the second plane section 12 shown in FIGS. 3A to 3B, and the third plane section 13 shown in FIGS. 4A to 4B, a vicinity region 10 and an outer-side region 20 are observed in the magnetic layer 4. That is, in the first plane section 11, the second plane section 12, and the third plane section 13, the magnetic layer 14 has the vicinity region 10 and the outer-side region 20.

The first plane section 11, the second plane section 12, and the third plane section 13 are defined as follows.

As shown in FIG. 1, the first plane section 11 is a central plane section passing through a midpoint MP of a line segment L connecting between a thickness directional one end edge 36 and a thickness directional other end edge 37 of the conducting wire 2. The first plane section 11 is along the plane direction of the inductor 1. Specifically, the first plane section 11 is substantially parallel to at least the other surface 6 in the thickness direction of the inductor 1.

The second plane section 12 is a one-side plane section passing through a first point P1 at a position traveling from the midpoint MP toward one side in the thickness direction by a length of ¼ of the line segment L (¼ L). The second plane section 12 is along the plane direction of the inductor 1. Specifically, the second plane section 12 is parallel to the first plane section 11.

The third plane section 13 is an other-side plane section passing through a second point P2 at a position traveling from the midpoint MP toward the other side in the thickness direction by the length (¼ L). The third plane section 13 is along the plane direction of the inductor 1. Specifically, the third plane section 13 is parallel to the first plane section 11.

As shown in FIGS. 2B, 3B, and 4B, the vicinity region 10 and the outer-side region 20 are disposed in this order from the outer end edge 30 of the insulating film 3 outwardly in the first direction in the first direction perpendicular to the flow direction and the thickness direction (corresponding to a right-left direction of FIGS. 2A to 4C), and the vicinity region 10 and the outer-side region 20 are continuous with each other without a gap therebetween.

The vicinity region 10 is a region within 50 μm outside the first directional outer end edge 30 of the insulating film 3 in the first direction, and is a belt-shaped region along the flow direction. Further, the vicinity region 10 is a portion having a strong influence on the inductance of the inductor 1 as compared with the outer-side region 20 to be described next.

The outer-side region 20 has a first outer-side region 17, a second outer-side region 18, and a third outer-side region 19. The first outer-side region 17, the second outer-side region 18, and the third outer-side region 19 are disposed in parallel in this order outwardly in the first direction.

The first outer-side region 17 is adjacent to the outside in the first direction of the vicinity region 10. Specifically, the first outer-side region 17 is a region in a range of above 50 μm and 75 μm or less outside from the first directional outer end edge 30 of the insulating film 3 in the first direction, and is a belt-shaped region along the flow direction. That is, the first outer-side region 17 is a region in a range of 25 μm or less from the first directional outer end edge of the vicinity region 10.

The second outer-side region 18 is adjacent to the outside in the first direction of the first outer-side region 17. Specifically, the second outer-side region 18 is a region in a range of above 75 μm and 95 μm or less outside from the first directional outer end edge 30 of the insulating film 3 in the first direction, and is a belt-shaped region along the flow direction. That is, the second outer-side region 18 is a region in a range of 20 μm or less from the first directional outer end edge of the first outer-side region 17.

The third outer-side region 19 is adjacent to the outside in the first direction of the second outer-side region 18. Specifically, the third outer-side region 19 is a region in a range of above 95 μm and 105 μm or less outside from the first directional outer end edge 30 of the insulating film 3 in the first direction, and is a belt-shaped region along the flow direction. That is, the third outer-side region 19 is a region in a range of 10 μm or less from the first directional outer end edge of the second outer-side region 18.

As shown in FIGS. 2A to 4C, when viewed in any of the first plane section 11, the second plane section 12, and the third plane section 13, an orientated region in which the anisotropic magnetic particles 8 are orientated in a generally linear shape along the flow direction of electricity is observed at least in the vicinity region 10.

When viewed in the above-described plane section, a case where an angle formed between a linear direction of the anisotropic magnetic particles 8 and the flow direction of the electricity is 15 degrees or less is defined that "the anisotropic magnetic particles 8 are orientated in the flow direction", and a case where the above-described angle is above 15 degrees is defined that "the anisotropic magnetic particles 8 are not orientated in the flow direction".

The orientated region is a region in which a ratio of the number of the anisotropic magnetic particles 8 orientated in the flow direction is above 50%, preferably 60% or more, more preferably 70% or more, further more preferably 75% or more, particularly preferably 80% or more with respect to the total sum of the number of the anisotropic magnetic particles 8 orientated in the flow direction and the number of the anisotropic magnetic particles 8 which are not orientated in the flow direction.

Preferably, when viewed in any of the first plane section 11, the second plane section 12, and the third plane section 13, the orientated region is observed in the vicinity region 10 and the first outer-side region 17.

More preferably, of the first plane section 11, the second plane section 12, and the third plane section 13, when viewed in one plane section (the first plane section 11 or the second plane section 12), and furthermore, two plane sections (for example, the first plane section 11 and the second plane section 12), the orientated region is observed in the vicinity region 10, the first outer-side region 17, and the second outer-side region 18.

Particularly preferably, of the first plane section 11, the second plane section 12, and the third plane section 13, when viewed in one plane section (specifically, the first plane section 11), the orientated region is observed in the vicinity region 10, the first outer-side region 17, the second outer-side region 18, and the third outer-side region 10.

Further, preferably, as referred to a column of Example 1 of Table 2, as shown in FIG. 2B, when viewed in the first plane section 11, the orientated region is observed in the vicinity region 10, the first outer-side region 17, the second outer-side region 18, and the third outer-side region 19. Further, as shown in FIG. 3B, when viewed in the second plane section 12, the orientated region is not observed in the third outer-side region 19, while being observed in the vicinity region 10, the first outer-side region 17, and the second outer-side region 18. Furthermore, as shown in FIG. 4B, when viewed in the third plane section 13, the orientated region is not observed in the second outer-side region 18 and the third outer-side region 19, while being observed in the vicinity region 10 and the first outer-side region 17. That is, preferably, as shown in FIGS. 2B, 3B, and 4B, the orientated region is observed in both the vicinity region 10 and the outer-side region 20.

Figure 3C:
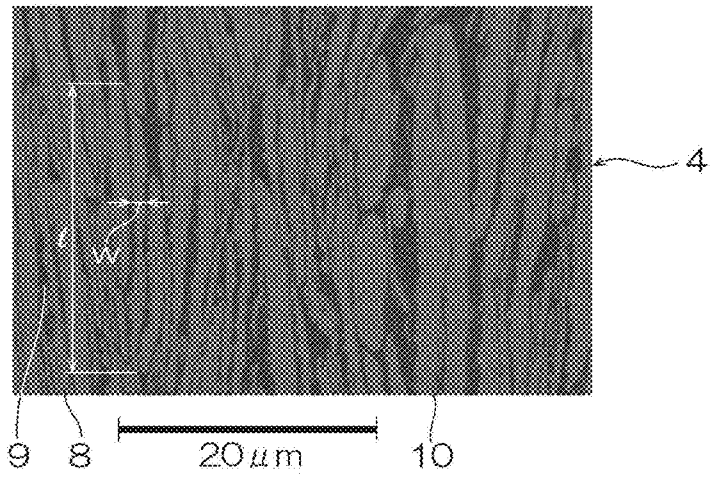

In the orientated region observed in the first plane section 11, the second plane section 12, and the third plane section 13 described above, it is observed that the anisotropic magnetic particles 8 are orientated along the circumferential direction of the conducting wire 2 with reference to the longitudinal section 16, while being orientated along the flow direction. In a case where an aspect ratio of the anisotropic magnetic particles 8 itself is 100, when an aspect ratio observed in the first plane section 11, specifically, an aspect ratio (longitudinal length l/lateral length w) (ref: FIGS. 2C, 3C, and 40 of the anisotropic magnetic particles 8 in a cross-sectional view described above is, for example, 50 or more, preferably 75 or more, it can be defined that the anisotropic magnetic particles 8 are orientated along the flow direction and the circumferential direction of the conducting wire 2.

When the anisotropic magnetic particles 8 are orientated in both the flow direction find the circumferential direction, a magnetic path surrounding the conducting wire 2 and along the flow of the electricity is formed in the magnetic layer 4, and thus, the inductance of the inductor 1 can be improved.

Further, when viewed in the first plane section 11, the second plane section 12, and the third plane section 13, the orientated region may be observed or may not be observed outside the third outer-side region 19 in the outer-side region 20.

As shown in FIG. 1, when viewed in the longitudinal section 16, an intersection portion (top portion) 50 is formed by two different kinds of anisotropic magnetic particles 8 having a different orientation direction. In one embodiment, the intersection portion 50 is located at the Other side in the thickness direction with respect to the third plane section 13. The intersection portion 50 passes through the other end edge 37 of the conducting wire 2, and is located at one side in the thickness direction of a fifth plane section (not shown) parallel to the third plane section 13. That is, the intersection portion 50 is located between the third plane section 13 and the fifth plane section (not shown).

A thickness of the magnetic layer 4 is, for example, 2 times or more, preferably 3 times or more, and for example, 20 times or less a radius of the conducting wire 2. Specifically, the thickness of the magnetic layer 4 is, for example, 100 μm or more, preferably 200 μm or more, and for example, 2000 μm or less, preferably 1000 μm or less. The thickness of the magnetic layer 4 is a distance between the one surface 5 and the other surface 6 of the magnetic layer 4.

The thickness of the inductor 1 is the same as that of the magnetic layer 4 described above.

Figure 5A:
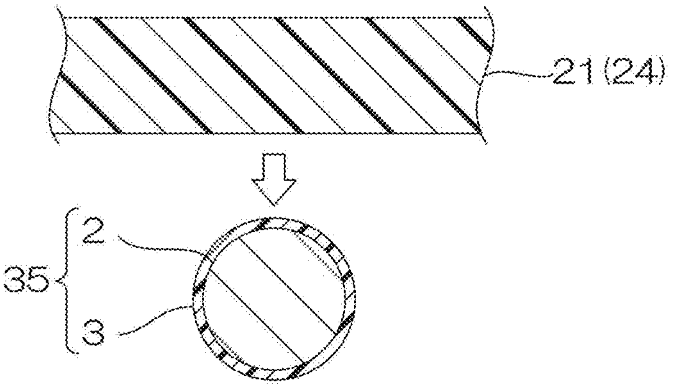
FIGS. 5A to 5C show process views for illustrating the production of the inductor shown in FIG. 1.
Figure 5B:
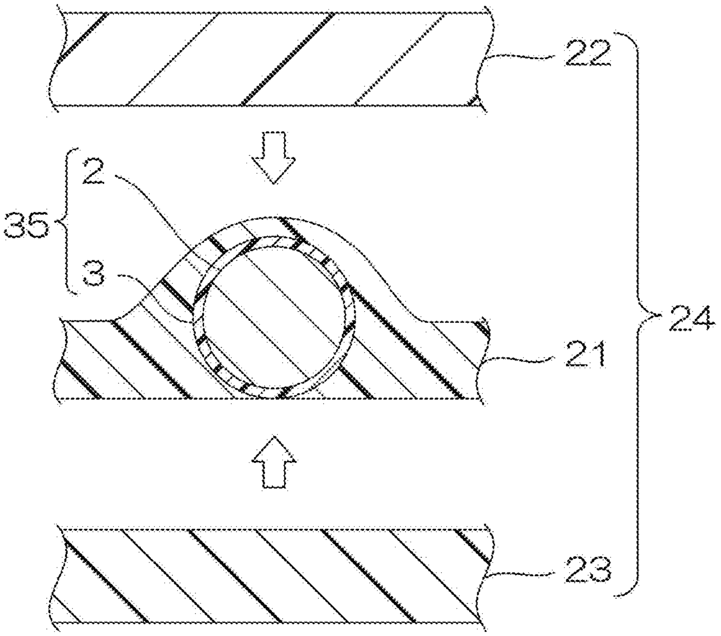

To obtain the inductor 1, for example, as shown in FIG. 5A, first, the magnetic sheet 24 as well as the wire 35 is prepared, and as shown in FIG. 5B, the wire 35 is collectively embedded by the magnetic sheet 24 to form the magnetic layer 4.

The magnetic sheet 24 may be one sheet and may also include a plurality of sheets. Specifically, the magnetic sheet 24 includes at least a first magnetic sheet 21 (FIG. 5A), and preferably separately includes the first magnetic sheet 21, a second magnetic sheet 22 (FIG. 5B), and a third magnetic sheet 23 (FIG. 5B).

Each of the materials for the first magnetic sheet 21, the second magnetic sheet 22, and the third magnetic sheet 23 includes the anisotropic magnetic particles 8 and the binder 9 described above, and each of the sheets has a sheet shape extending in the plane direction. Each of the first magnetic sheet 21, the second magnetic sheet 22, and the third magnetic sheet 23 is preferably prepared as a B-stage sheet. Each of the first magnetic sheet 21, the second magnetic sheet 22, and the third magnetic sheet 23 may be a single layer, or may consist of a multilayer (specifically, an inner-side sheet, an outer-side sheet located at the opposite side of the conducting wire 2 with respect to the inner-side sheet, and the like). Examples of the first magnetic sheet 21, the second magnetic sheet 22, and the third magnetic sheet 23 include soft magnetic thermosetting adhesive films described in Japanese Unexamined Patent Publications No. 2014-165363 and 2015-92544.

As shown by an arrow of FIG. 5A, and FIG. 5B, for example, first, the wire 35 is embedded by the first magnetic sheet 21 shown by a solid line (preferably, the wire 35 is thermally pressed). Thus, the intersection portion 50 is formed in the first magnetic sheet 21.

Figure 5C:
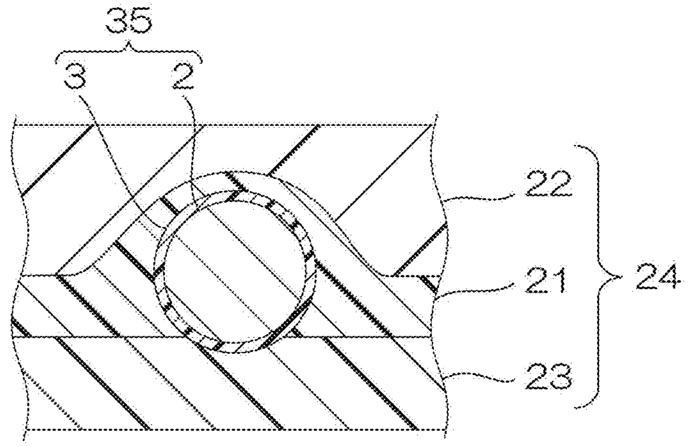

As shown by the arrow of FIG. 5B, and FIG. 5C, thereafter, if necessary, each of the second magnetic sheet 22 and the third magnetic sheet 23 is disposed (preferably, thermally pressed) on each of the one surface and the other surface so as to sandwich the wire 35 and the first magnetic sheet 21 in the thickness direction therebetween. Thus, the magnetic layer 4 having the one surface 5 and the other surface 6 is formed.

Thereafter, when the magnetic layer 4 is in a B-stage state, it is brought into a C-stage state.

In FIG. 5C, the boundary between the first magnetic sheet 21 and the second magnetic sheet 22, and the boundary between the first magnetic sheet 21 and the third magnetic sheet 23 are shown. As it is clear from an SEM image of FIG. 1, they may be obscure.

Then, in the inductor 1, of the first plane section 11, the second plane section 12, and the third plane section 13, when viewed in at least each of the two plane sections, the orientated region in which the anisotropic magnetic particles 8 are orientated in the flow direction is observed in the vicinity region 10 having a strong influence on the inductance of the inductor 1. Therefore, a magnetic path along the flow direction is formed in the vicinity region 10.

Further, since the conducting wire 2 has the conducting wire circumferential surface 7 when viewed in the longitudinal section, the anisotropic magnetic particles 8 are more easily orientated in the flow direction in the magnetic layer 4 facing the conducting wire circumferential surface 7.

Furthermore, the magnetic layer 4 contains the anisotropic magnetic particles 8 at a ratio of 40% by volume or more.

Therefore, the inductor 1 has excellent inductance.

In particular, in the inductor 1 of one embodiment, when viewing the magnetic layer 4 in each of the three of the first plane section 11, the second plane section 12, and the third plane section 13, since the orientated region is observed in the vicinity region 10, the inductor 1 has further more excellent inductance.

Furthermore, in the orientated region of the inductor 1, the plane direction of the anisotropic magnetic particles 8 are orientated in the circumferential direction of the conducting wire 2. Therefore, a magnetic path surrounding the conducting wire 2 is formed. As a result, the inductance is further more excellent.

Modified Examples

In the modified examples, the same reference numerals are provided for members and steps corresponding to each of those in one embodiment, and their detailed description is omitted. Also, the modified examples can achieve the same function and effect as that of one embodiment unless otherwise specified. Furthermore, one embodiment and the modified examples thereof can be appropriately used in combination.

In one embodiment, as shown in FIGS. 2B, 3B, and 4B, the orientated region is observed in any vicinity region 10 of the first plane section 11, the second plane section 12, and the third plane section 13.

Figure 6:
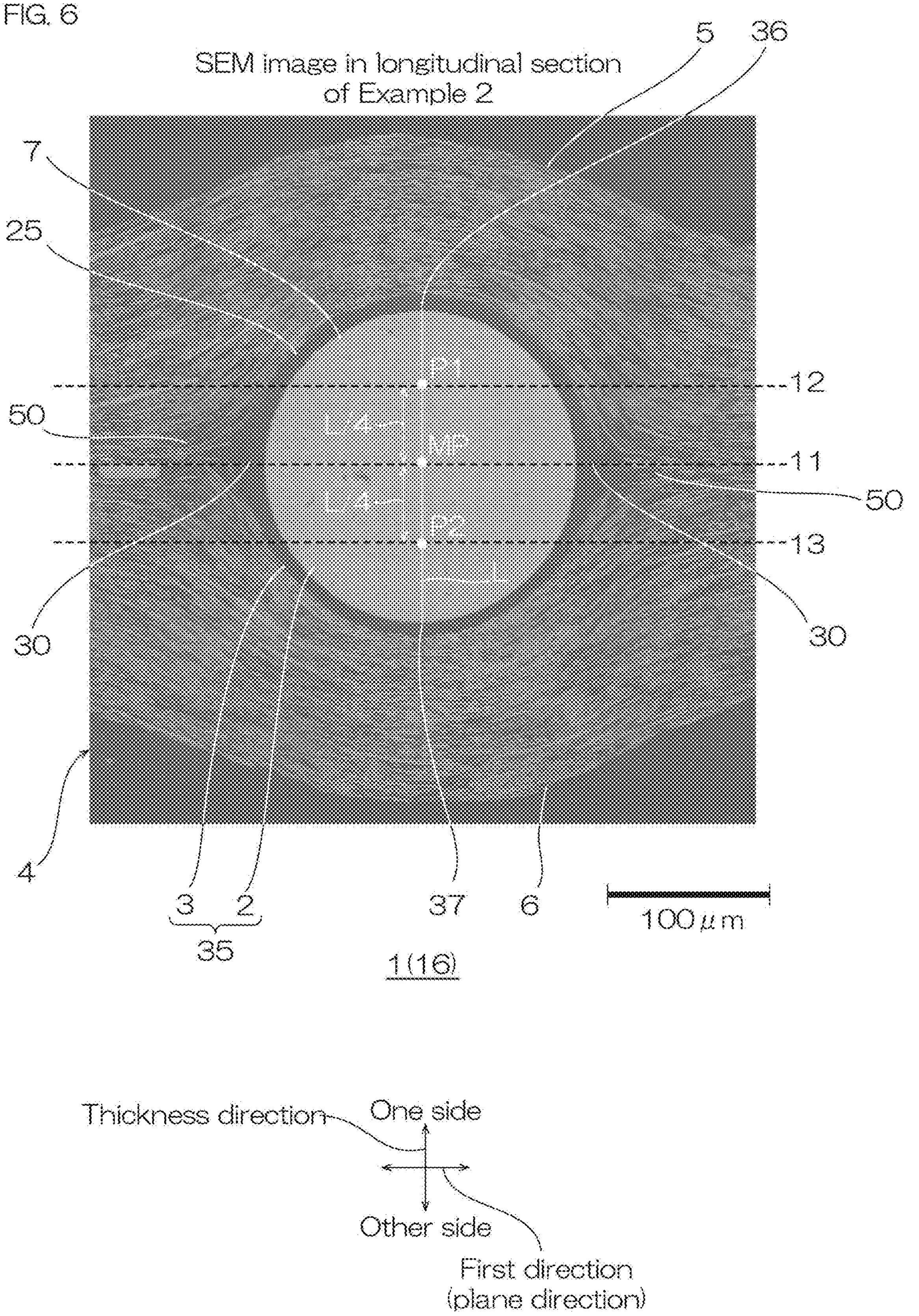
FIG. 6 shows an image process view of an SEM image of a longitudinal section of Example 2 which is a specific example of a modified example of the inductor shown in FIG. 1.

However, the cross-section in which the orientated region is observed is not limned to all (three) of the above-described three, and may be two. For example, though not drawn as the first plane section 11, the second plane section 12, and the third plane section 13, as referred to a column of Example 2 of Table 1, the orientated region is not observed in the vicinity region 10 when viewed in the first plane section 11, while being observed in the vicinity region 10 (furthermore, the first outer-side region 17 and the second outer-side region 18) when viewed in the second plane section 12 and the third plane section 13. In the above-described modified example, as shown in FIG. 6, the intersection portion 50 is, for example, located on the first plane section 11.

Figure 7:
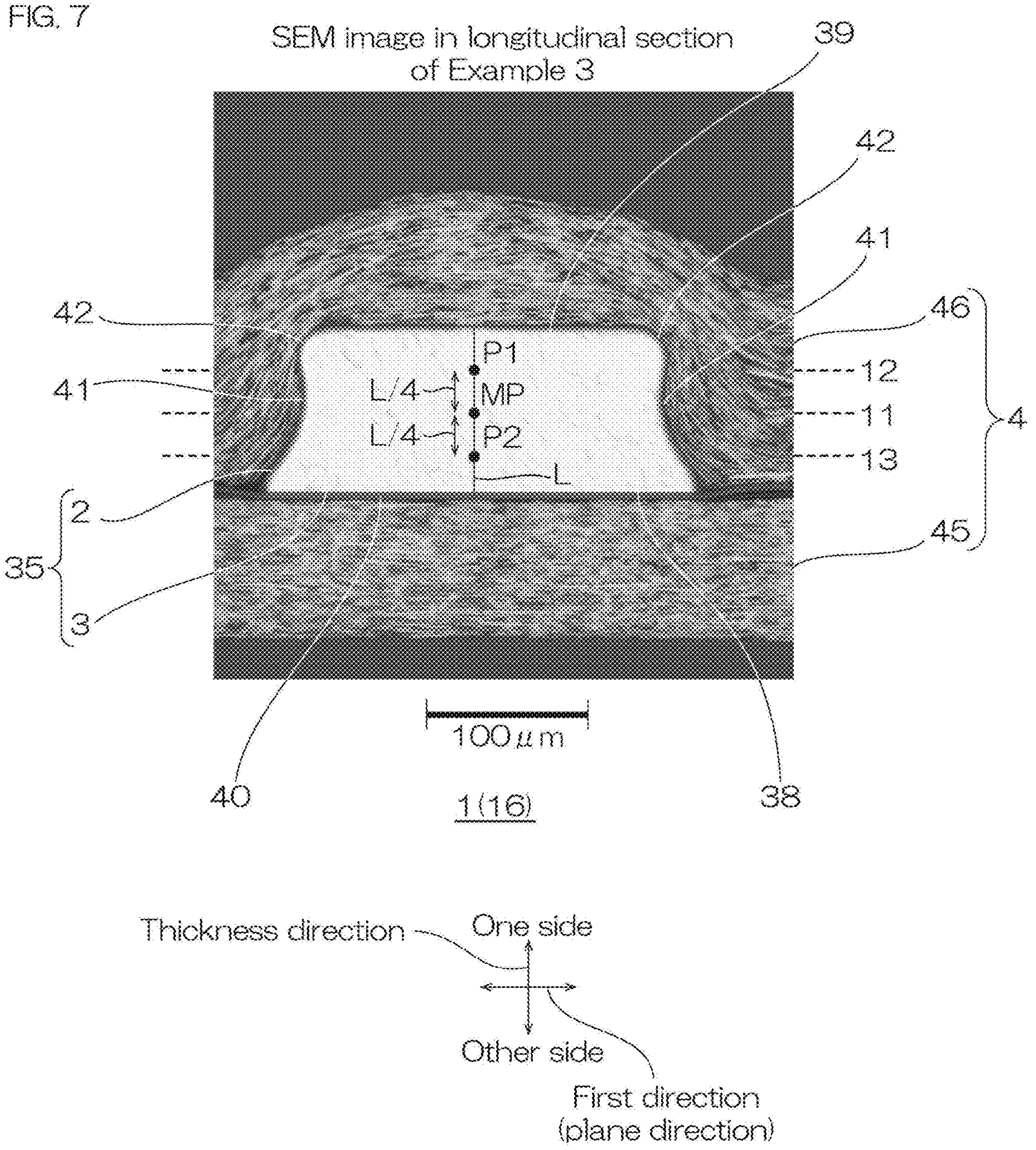
FIG. 7 shows an image process view of an SEM image of a longitudinal section of Example 3 which is a specific example of a modified example of an inductor of the present invention.

Further, though not shown, in the above-described modified example, in the second plane section 12 and the third plane section 13, the orientated region is observed in the vicinity region 10. However, as two of the three plane sections, it is not limited to the second plane section 12 and the third plane section 13 described above, and it may be any of the first plane section 11 and the second plane section 12 (ref: FIGS. 7 to 8C to be described later) or the first plane section 11 and the third plane section 13.

In a case where the orientated region is observed in the vicinity region 10 when viewed in the first plane section 11 and the second plane section 12, the orientated region is not observed in the vicinity region 10 when viewed in the third plane section 13. Further, in a case where the orientated region is observed in the vicinity region 10 when viewed in the first plane section 11 and the third plane section 13, the orientated region is not observed in the vicinity region 10 when viewed in the second plane section 12.

Preferably, as in one embodiment shown in FIGS. 1 to 4C, the orientated region is observed in the vicinity region 10 when viewed in each of the first plane section 11, the second plane section 12, and the third plane section 13. The inductor 1 of one embodiment shown in FIGS. 1 to 4C has further more excellent inductance than the inductor 1 of the modified example shown in FIGS. 6 to 7C.

Further, in one embodiment, as shown in FIG. 1, the wire 35 and the conducting wire 2 have a generally circular shape when viewed in the longitudinal section 16. Alternatively, as shown in FIG. 7, it may have, for example, a generally rectangular shape.

The inductor 1 includes a conductive pattern 38 as one example of a conducting wire, the insulating film 3, find the magnetic layer 4. The inductor 1 is a modified example in which the orientated region is observed in the vicinity region 10 in the first plane section 11 and the second plane section 12 which are the two plane sections of the three plane sections.

The conductive pattern 38 integrally includes one surface 39 and an other surface 40 facing each other in the thickness direction when viewed in the longitudinal section 16, and two connecting surfaces 41 connecting both end edges in the first direction of the one surface 39 to those in the first direction of the other surface 40.

Each of the one surface 39 and the other surface 40 is a flat surface parallel to each other.

Furthermore, in the modified example shown in FIG. 7, the insulating film 3 may cover the entire outer peripheral surface of the conducting wire 2.

Further, the conductive pattern 38 has two corner portions 42 formed by the one surface 39 and the connecting surfaces 41, and each of the two corner portions 42 constitutes a curved portion (curved surface). A radius of curvature of the curved surface of the corner portion 42 is for example, 5 μm or more, and 30 μm or less.

A thickness of the conductive pattern 38 is a distance between the one surface 39 and the other surface 40. A width of the conductive pattern 38 is an average distance between the two connecting surfaces 41, and is, for example, 20 μm or more, and 1000 μm or less.

The insulating film 3 is disposed on the one surface 39, the other surface 40, and the connecting surface 41 of the conductive pattern 38.

The magnetic layer 4 has a first magnetic layer 45 and a second magnetic layer 46.

The first magnetic layer 45 has a gene rails plate shape extending in the plane direction. A material for the first magnetic layer 45 is the above-described magnetic composition. In the first magnetic layer 45, the anisotropic magnetic particles 8 are orientated in the flow direction and the plane direction.

The second magnetic layer 46 has a sheet shape extending in the plane direction. One surface in the thickness direction of the second magnetic layer 46 is exposed toward one side in the thickness direction, and the other surface of the second magnetic layer 46 covers the one surface 39 and the connecting surface 41 of the conductive pattern 38 and is in contact with one surface of the first magnetic laser 45 exposed from the conductive pattern 38.

In the second magnetic layer 46, the anisotropic magnetic particles 8 facing the one surface 39 are orientated in the plane direction and the flow direction: as described later, the anisotropic magnetic particles 8 facing live connecting surface 41 are orientated along the thickness direction and the flow direction, and the anisotropic magnetic particles 8 facing the corner portion 42 are also orientated along the circumferential direction with the corner portion 42 as a center and the flow direction.

Then, in the modified example, when viewed in each of the first plane section 11 and the second plane section 12, though not shown, the orientated region is observed at least in the vicinity region 10. However, wheat viewed in the third plane section 13, it is allowed that the orientated region is not observed in the vicinity region 10.

Further, though not shown, the corner portion 42 of the conductive pattern 38 may not be a curved portion, that is, may not have a curved surface. The corner portion 42 may be a bent portion bending at, for example, 45 degrees or more, 60 degrees or more, 75 degrees or more, and for example, 135 degrees or less, 120 degrees or less, 105 degrees or less (more specifically, 90 degrees).

Further, in one embodiment, the inductor 1 includes the plurality of wires 35. Alternatively, for example, it may also include the single wire 35.

In the description above, the definition of the vicinity region 10 is represented using the absolute distance from the first directional outer end edge 30. Alternatively, it can be represented using the relative distance, and for example, when the anisotropic magnetic particles 8 are flat-shaped, the vicinity region 10 can be defined as a region within 0.08 with respect to the average thickness of the anisotropic magnetic particle 8 from the first directional outer end edge 30 outwardly in the first direction. That is, a ratio of the above-described distance to the average thickness of the anisotropic magnetic particles 8 can be defined as 0.08. Also, in the same manner as in the vicinity region 10, the first outer-side region 17 can be defined as a region of above 0.08 within 0.13 from the first directional outer end edge 30 outwardly in the first direction, the second outer-side region 18 can be defined as a region of above 0.13 within 0.175 from the first directional outer end edge 30 outwardly in the first direction, and the third outer-side region 19 can be defined as a region of above 0.175 within 0.225 from the first directional outer end edge 30 outwardly in the first direction.

Further, a ratio of the anisotropic magnetic particles 8 in the magnetic layer 4 may be uniform in the magnetic layer 4, and also may be higher or lower as they are away from each of the wires 35. To produce the inductor having a higher ratio of the anisotropic magnetic particles 8 in the magnetic laser 4 as they move away from the wire 35, for example, as shown in FIG. 5B, a presence ratio of the anisotropic magnetic particles 8 in the second magnetic sheet 22 and a presence ratio of the anisotropic magnetic particles 8 in the third magnetic sheet 23 are set higher than the presence ratio of the anisotropic magnetic particles 8 in the first magnetic sheet 21.

EXAMPLES

Next, the present invention is further described based on Examples and Comparative Examples below. The present invention is however not limited by these Examples and Comparative Examples. The specific numerical values in mixing ratio (content ratio), property value, and parameter used in the following description can be replaced with upper limit values (numerical values defined as “or less” or “below”) or lower limit values (numerical values defined as “or more” or “above”) of corresponding numerical values in mixing ratio (content ratio), property value, and parameter described in the above-described “DESCRIPTION OF EMBODIMENTS”.

Example 1

Example Drawn in FIGS. 1 to 4C
<Inductor Based on One Embodiment>

The inductor 1 was produced based on one embodiment. Specifically, the wire 35 including the conducting wire 2 made of copper having a radius of 100 μm and the insulating film 3 having a thickness of 10 μm was prepared. Separately, the first magnetic sheet 21 was prepared as a B-stage sheet. A layer configuration and a formulation of the first magnetic sheet 21 are shown in Table 1.

As shown in FIG. 5A, then, the first magnetic sheet 21 was attached (thermally pressed) to the wire 35.

As shown in FIG. 5B, the second magnetic sheet 22 and the third magnetic sheet 23 were subsequently prepared as a B-stage sheet. A layer configuration and a formulation of the second magnetic sheet 22 and the third magnetic sheet 23 are shown in Table 1.

As shown by the arrows of FIG. 5B, the wire 35 and the first magnetic sheet 21 were sandwiched between the second magnetic sheet 22 and the third magnetic sheet 23 to be attached (thermally pressed).

Thereafter, a thermosetting component in the first magnetic sheet 21, the second magnetic sheet 22, and the third magnetic sheet 23 was brought into a C-stage state.

Thus, the wire 35 was embedded by the magnetic layer 4 consisting of the first magnetic sheet 21, the second magnetic sheet 22, and the third magnetic sheet 23 in a C-stage state, and as shown in FIG. 1, the inductor 1 including the wire 35 and the magnetic layer 4 was produced.

Thereafter, as to the resulting inductor 1, the SEM observation of each of the longitudinal section 16, the first plane section 11, the second plane section 12, and the third plane section 13 was carried out to in to observe the orientated region. Image process views of these are shown in FIGS. 1 to 4C, and the observation results of the orientated region are described in Table 2.

Example 2

Example Drawn in FIG. 6
<Production Example of Inductor Based on Modified Example of One Embodiment>

The inductor 1 shown in FIG. 6 was obtained in the same manner as in Example 1, except that the wire 35 was sandwiched by only the second magnetic sheet 22 and the third magnetic sheet 23 without using the first magnetic sheet 21, and the SEM observation of each of the first plane section 11, the second plane section 12, and the third plane 13 was carried out.

The observation results of the orientated region are described in Table 2.

Example 3

Example Drawn in FIGS. 7 to 8C

<Production Example of Inductor Based on Modified Example of One Embodiment>

The inductor 1 was obtained in the same manner as in Example 1, except that the conducting wire 2 having the same cross-sectional area (positive cross-sectional area) in the longitudinal section 16 as that in Example 1 and having a generally rectangular shape was used, and the SEM observation of each of the first plane section 11, the second plane section 12, and the third plane section 13 was carried out. The first magnetic layer 45 covered the conducting wire 2 through the insulating film 3 by the B-stage sheet.

The observation results of the orientated region are described in Table 2.

Comparative Example 1

Example Drawn in FIGS. 9A to 9B

The inductor 1 was obtained in the same manner as in Example 2, except that the second magnetic sheet 22 and the third magnetic sheet 23 at the time of attachment to the wire 35 were changed to a cured product in a C-stage state, and the SEM observation of each of the first plane section 11, the second plane section 12, and the third plane section 13 was carried out.

The observation results of the orientated region are described in Table 3.

Comparative Example 2

The inductor 1 was obtained in the same manner as in Example 3, except that the second magnetic sheet 22 and the third magnetic sheet 23 at the time of attachment were changed to a cured product in a C-stage state, and the SEM observation of each of the first plane section 11, the second plane section 12, and the thud plane section 13 was carried out.

The observation results of the orientated region are described in Table 3.

Comparative Example 3

Figure 10:
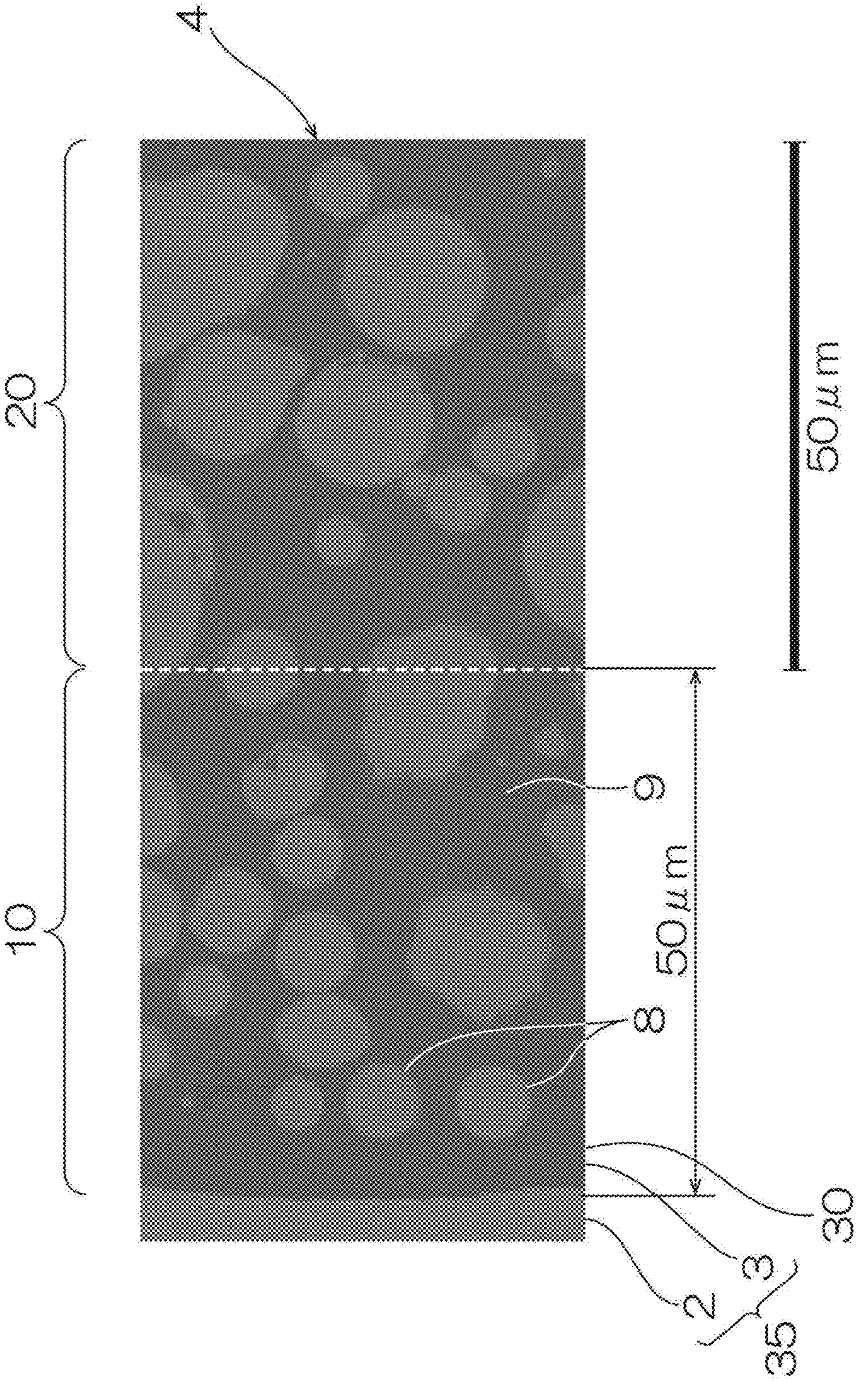
FIG. 10 shows an image process view of an SEM image of a first plane section of Comparative Example 3.

Example Drawn in FIG. 10

The inductor 1 was obtained in the same manner as in Example 11, except that spherical magnetic particles (average particle size of 20 μm, Fe—Si—Al alloy) were used instead of the anisotropic magnetic particles 8, and the SEM observation of each of the first plane section 11, the second plane section 12, and the third plane section 13 was carried out.

The observation results of the orientated region are described in Table 3.

<Inductance>

The one end edges 36 at both end portions in the flow direction of the conducting wire 2 were exposed from the insulating film 3 and the magnetic layer 4, and both end portions in the flow direction of the conducting wire 2 were connected to an impedance analyzer (manufactured by Agilent Technologies Japan, Ltd.: 4294A) to determine the inductance of the inductor 1.

The results are shown in Tables 2 and 3.

TABLE 1

| | | | First Magnetic Sheet | | Second Magnetic Sheet | Third Magnetic Sheet | |
|---|---|---|---|---|---|---|---|
| | | | B-stage Sheet | | B-stage Sheet | B-stage Sheet | |
| | | | Inner-Side Sheet | Outer-Side Sheet | Five Sheets | One Inner-Side Sheet | Five Outer-Side Sheets |
| Magnetic Composition | | | % by volume | % by volume | % by volume | % by volume | % by volume |
| Magnetic Particles | Flat-shaped Soft Magnetic Particles | Fe-Si-Al Alloy (Average Particle Size of 40 μm) | 50 | 60 | 60 | 50 | 60 |
| Thermoplastic Component | Carboxyl Group-Containing Acrylic Acid Ester Copolymer | TEISANRESIN SG-70L Manufactured by Nagase ChemteX Corporation | 23.7 | 18.8 | 18.8 | 23.7 | 18.8 |
| Thermosetting Component (Epoxy Resin Composition) | Cresol Novolak-Type Epoxy Resin (Main Agent) | KI-3000-4 Manufactured by Nippon Steel & Sumikin Chemical Co., Ltd. Epoxy Equivalent of 199 g/eq | 12.2 | 9.7 | 9.7 | 12.2 | 9.7 |
| | Phenol Resin (Curing Agent) | MEH-7851SS Manufactured by MEIWA PLASTIC INDUSTRIES LTD. | 12.4 | 9.8 | 9.8 | 12.4 | 9.8 |
| | Imidazole Compound (Curing Accelerator) | 2PHZ-PW Manufactured by SHIKOKU CHEMICALS CORPORATION | 0.4 | 0.3 | 0.3 | 0.4 | 0.3 |

TABLE 2

| Ex./Comparative Ex. | | Ex. 1 | | | | Ex. 2 | | | |
|---|---|---|---|---|---|---|---|---|---|
| Shape of Anisotropic Magnetic Particles | | Flat | | | | Flat | | | |
| Shape in Longitudinal Section of Conducting Wire | | Circular | | | | Circular | | | |
| Position of Intersection Portion | | Other Side to First Plane Section | | | | Overlapped with First Plane Section | | | |
| First Magnetic Sheet at Attachment | | B-Stage Sheet | | | | B-Stage Sheet | | | |
| Content Ratio of Anisotropic Magnetic Particles in Magnetic Layer (% by volume) | | 60 | | | | 60 | | | |
| | | Region | | | | | | | |
| Cross-Section | | Vicinity Region | First Outer-Side Region | Second Outer-Side Region | Third Outer-Side Region | Vicinity Region | First Outer-Side Region | Second Outer-Side Region | Third Outer-Side Region |
| Presence or Absence of Orientated Region | Second Plane Section | Presence | Presence | Presence | Absence | Presence | Presence | Absence | Absence |
| | First Plane Section | Presence | Presence | Presence | Presence | Absence | Absence | Absence | Absence |
| | Third Plane Section | Presence | Presence | Absence | Absence | Presence | Presence | Absence | Absence |
| Inductance [H] | | 120 | | | | 110 | | | |

| Ex./Comparative Ex. | | Ex. 3 | | | |
|---|---|---|---|---|---|
| Shape of Anisotropic Magnetic Particles | | Flat | | | |
| Shape in Longitudinal Section of Conducting Wire | | Generally Rectangular | | | |
| Position of Intersection Portion | | — | | | |
| First Magnetic Sheet at Attachment | | B-Stage Sheet | | | |
| Content Ratio of Anisotropic Magnetic Particles in Magnetic Layer (% by volume) | | 60 | | | |
| | | Region | | | |
| Cross-Section | | Vicinity Region | First Outer-Side Region | Second Outer-Side Region | Third Outer-Side Region |
| Presence or Absence of Orientated Region | Second Plane Section | Presence | Presence | Absence | Absence |
| | First Plane Section | Presence | Presence | Absence | Absence |
| | Third Plane Section | Absence | Absence | Absence | Absence |
| Inductance [H] | | 78 | | | |

TABLE 3

| Ex./Comparative Ex. | Comparative Ex. 1 | Comparative Ex. 2 | Comparative Ex. 3 |
|---|---|---|---|
| Shape of Anisotropic Magnetic Particles | Flat | Flat | Spherical |
| Shape in Longtudinal Section of Conducting Wire | Circular | Generally Rectangular | Generally Rectangular |
| Position of Intersection Portion | — | — | — |

TABLE 3-continued

| Ex./Comparative Ex. | | Comparative Ex. 1 | Comparative Ex. 2 | Comparative Ex. 3 |
|---|---|---|---|---|
| First Magnetic Sheet at Attachment | | C-Stage Cured Product | C-Stage Cured Product | B-Stage Sheet |
| Content Ratio of Anisotropic Magnetic Particles in Magnetic Layer (% by volume) | | 60 | 60 | 60 |
| Presence or Absence of Orientated Region in Vicinity Region | Second Plane Section | Absence | Absence | Absence |
| | First Plane Section | Absence | Absence | Absence |
| | Third Plane Section | Absence | Absence | Absence |
| Inductance [H] | | 50 | 63.5 | 39.6 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The inductor of the present invention is, for example, loaded on an electronic device and the like.

DESCRIPTION OF REFERENCE NUMERALS

1 Inductor
2 Conducting Wire
3 Insulating Film
4 Magnetic Layer
8 Anisotropic magnetic particles
10 Vicinity region
16 Longitudinal section
11 First plane section
12 Second plane section
13 Third plane section
15 Orientated region
16 Longitudinal Section
25 Insulating circumferential surface
35 Wire
38 Conductive Pattern
L Line segment
MP Midpoint
P1 First point
P2 Second point

The invention claimed is:

1. An inductor comprising:

a wire including a conducting wire, and an insulating film disposed on a circular circumferential surface of the conducting wire, and a magnetic layer for embedding the wire, wherein the wire extends along one direction included in a plane direction perpendicular to a thickness direction;

wherein the magnetic layer is formed from a plurality of magnetic sheets including a first magnetic sheet and a second magnetic sheet;

wherein the magnetic layer contains an anisotropic magnetic particle at a ratio of 40% by volume or more;

wherein the magnetic layer includes a top portion formed by two different kinds of anisotropic magnetic particles having a different orientation direction at a boundary between the first magnetic sheet and the second magnetic sheet;

wherein the top portion protrudes outwardly with respect to the wire when viewed in a longitudinal section;

wherein of a first plane section, a second plane section, and a third plane section along a plane direction perpendicular to a thickness direction of the magnetic layer, when viewed in at least each of the two plane sections, in a first direction perpendicular to the direction along which the wire extends and the thickness direction, an orientated region, in which the anisotropic magnetic particle is disposed along the direction along which the wire extends is observed in a vicinity region within 50 μm from an outer end edge surface of the insulating film outwardly;

wherein the vicinity region forms a circular, belt-shaped region around the wire in a direction perpendicular to the thickness direction;

wherein in the orientated region, a plane direction of the anisotropic magnetic particle in the magnetic layer covering the circular circumferential surface of the insulating film is orientated along a circular circumferential direction of the conducting wire;

wherein the first plane section passes through a midpoint of a line segment L connecting one end edge to the other end edge in the thickness direction of the conducting wire, wherein the second plane section passes through a first point at a position traveling from the midpoint toward one side in the thickness direction by a length of ¼ of the line segment L (¼ L), and wherein the third plane section passes through a second point at a position traveling from the midpoint toward the other side in the thickness direction by the length (¼ L).

2. The inductor according to claim 1, wherein when viewing the magnetic layer in each of the first plane section, the second plane section, and the third plane section, the orientated region is observed in the vicinity region.

3. The inductor according to claim 1, wherein the anisotropic magnetic particle has a plate shape.

* * * * *